US012684552B2

(12) United States Patent
Yuan et al.

(10) Patent No.: US 12,684,552 B2
(45) Date of Patent: Jul. 14, 2026

(54) RESOURCE CONFIGURATION METHOD AND COMMUNICATION APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/618,524

(22) Filed: Mar. 27, 2024

(65) Prior Publication Data

US 2024/0244608 A1 Jul. 18, 2024

Related U.S. Application Data

(63) Continuation of application No. PCT/CN2022/123085, filed on Sep. 30, 2022.

(30) Foreign Application Priority Data

Sep. 30, 2021 (CN) .......................... 202111162607.6

(51) Int. Cl.
*H04B 7/155* (2006.01)
*H04W 40/22* (2009.01)
(Continued)

(52) U.S. Cl.
CPC .... *H04W 72/0473* (2013.01); *H04B 7/15535* (2013.01); *H04B 7/15542* (2013.01);
(Continued)

(58) Field of Classification Search
CPC .... H04B 7/02–17; H04B 17/0082–409; H04L 5/0001–0098; H04W 8/22–245; H04W 24/02–10; H04W 36/0005–385; H04W 40/005–38; H04W 48/02–20; H04W 52/02–60; H04W 72/02–569; H04W 84/005–22; H04W 88/005–188; H04W 92/02–24

See application file for complete search history.

(56) References Cited

U.S. PATENT DOCUMENTS

2023/0094729 A1* 3/2023 Abedini ............ H04W 72/0473
2024/0397443 A1* 11/2024 Khoshnevisan .... H04W 52/146

OTHER PUBLICATIONS

3GPP TS 38.473 V16.6.0, 3rd Generation Partnership Project; Technical Specification Group Radio Access Network; NG-RAN; F1 application protocol (F1AP) (Release 16), Jul. 2021, total 463 pages.

* cited by examiner

*Primary Examiner* — Timothy J Weidner
(74) *Attorney, Agent, or Firm* — HAUPTMAN HAM, LLP

(57) ABSTRACT

A resource configuration method includes obtaining, by a relay node, first information, wherein the first information comprises an identifier of at least one beam useable for sending a first signal. The method further includes sending second information to a parent node based on the first information, wherein the second information comprises a correspondence between the at least one beam and a desired power spectrum density (PSD). The method further includes receiving third information from the parent node, wherein the third information is useable to indicate to the relay node to determine a transmit power based on the third information.

20 Claims, 10 Drawing Sheets

(51) Int. Cl.

| | |
|---|---|
| *H04W 40/24* | (2009.01) |
| *H04W 52/42* | (2009.01) |
| *H04W 52/46* | (2009.01) |
| *H04W 72/044* | (2023.01) |
| *H04W 84/02* | (2009.01) |
| *H04W 88/02* | (2009.01) |
| *H04W 88/08* | (2009.01) |
| *H04W 88/12* | (2009.01) |
| *H04W 92/02* | (2009.01) |
| *H04W 92/10* | (2009.01) |
| *H04W 92/12* | (2009.01) |
| *H04W 92/20* | (2009.01) |

(52) U.S. Cl.

CPC ........... *H04W 40/22* (2013.01); *H04W 40/24* (2013.01); *H04W 52/42* (2013.01); *H04W 52/46* (2013.01); *H04W 72/046* (2013.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(a)

(b)

(a)

(b)

RESOURCE CONFIGURATION METHOD AND COMMUNICATION APPARATUS

CROSS-REFERENCE TO RELATED APPLICATIONS

This application is a continuation of International Application No. PCT/CN2022/123085, filed on Sep. 30, 2022, which claims priority to Chinese Patent Application No. 202111162607.6, filed on Sep. 30, 2021, the disclosures of the aforementioned applications are hereby incorporated by reference in their entireties.

TECHNICAL FIELD

This application relates to the field of mobile communication technologies, and in particular, to a resource configuration method and a communication apparatus.

BACKGROUND

With continuous development of mobile communication technologies, to better improve spectrum utilization, reduce network deployment costs, and the like, a manner in which a wireless relay node (RN) establishes a connection to a core network through a wireless backhaul link is often used for communication and transmission.

However, in this communication scenario, there is often a problem that a parent node cannot determine desired power spectrum density (PSD) that corresponds to a beam reported by a relay node. Consequently, transmit power of the beam cannot be set accurately and effectively, and communication quality is affected.

SUMMARY

This application provides a resource configuration method and a communication apparatus, so that a parent node can configure transmit power of a beam more flexibly and accurately, to effectively reduce communication interference.

According to a first aspect, a resource configuration method is provided. The method may be performed by a first communication apparatus. The first communication apparatus may be a communication device or a communication apparatus that can support the communication device in implementing a function required by the method, for example, a chip system.

In some embodiments, the communication device is a relay node connected to at least one parent node for description. In some embodiments, the method includes:

The relay node obtains first information, where the first information includes an identifier of at least one beam that is used to send a first signal.

The relay node sends second information to the parent node based on the first information, where the second information includes a correspondence between the beam and desired power spectrum density PSD. The relay node receives third information sent by the parent node, where the third information indicates the relay node to determine transmit power based on information sent by using the beam. In an example, the beam is a beam used by an MT in the relay node to communicate with the parent node.

In some embodiments, the first information is obtained by the relay node from a donor node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by a DU in the relay node.

In some embodiments, each beam in the beam corresponds to one or more desired PSD ranges.

In some embodiments, each PSD range corresponds to a plurality of beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam: and the first case is determined based on at least one parameter.

In some embodiments, the parameter includes at least one of the following:

a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

The parameter in this application may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

In some embodiments, the relay node may further receive fourth information sent by the parent node, where the fourth information includes a restriction relationship between an uplink beam and a downlink beam. When using the beam for the communication and transmission, the relay node may restrict, based on the fourth information, use of the downlink beam that corresponds to the beam.

In some embodiments, the downlink beam is a beam used by a DU in the relay node to communicate with a corresponding terminal.

In some embodiments, the relay node may further obtain a first condition, where the first condition indicates to lift a restriction on the downlink beam. The relay node lifts the restriction on the downlink beam when determining that the first condition is satisfied.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, when determining that one of first cells satisfies the first condition, the relay node may lift a restriction on a downlink beam that corresponds to a cell that satisfies a second condition. Alternatively, when determining that one of first cells satisfies the first condition, the relay node may lift a restriction on downlink beams that correspond to all cells in a first cell. The downlink beams that correspond to all the cells in the first cell are the same.

In some embodiments, if the first condition includes that the second signal exists in the slot, a resource type of the slot is considered as a hard resource. Alternatively, if the first condition includes that the second signal exists in the first symbol in the slot, the restriction on the downlink beam that corresponds to the beam in the first symbol is lifted. The second signal includes one or more of the SS/PBCH block, the PDCCH common search space set, and the periodic CSI-RS. When a resource of the DU is configured as a hard resource, sending and/or receiving on the resource in any cell of an IAB-DU may not be restricted. The restriction includes the restriction on the downlink beam.

According to a second aspect, a resource configuration method is provided. The method may be performed by a second communication apparatus. The second communication apparatus may be a communication device or a communication apparatus that can support the communication device in implementing a function required by the method, for example, a chip system.

In some embodiments, the communication device is a parent node, for example, a first parent node, in a plurality of parent nodes connected to a relay node for description. The method includes:

The parent node sends first information to the relay node, where the first information includes an identifier of at least one beam that is used to send a first signal. The parent node receives second information from the relay node, where the second information includes a correspondence between the identifier of the beam and desired power spectrum density PSD. The parent node sends third information to the relay node based on the second information, where the third information indicates the relay node to determine transmit power based on information sent by using the beam.

In some embodiments, the beam is a beam used by an MT in the relay node to communicate with the parent node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by a DU in the relay node.

In some embodiments, each beam in the beam corresponds to one or more desired PSD ranges, or each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam; and the first case is determined based on at least one parameter.

In some embodiments, the parameter includes at least one of the following:

a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

In some embodiments, the parameter may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

In some embodiments, the parent node may further send fourth information to the relay node, where the fourth information includes a restriction relationship between an uplink beam and a downlink beam.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

According to a third aspect, a resource configuration method is provided. The method may be performed by a first communication apparatus. The first communication apparatus may be a communication device or a communication apparatus that can support the communication device in implementing a function required by the method, for example, a chip system.

The following uses an example in which the communication device is a relay node connected to at least one parent node for description. The method includes:

In some embodiments, the relay node receives fourth information sent by the parent node, where the fourth information includes a restriction relationship between an uplink beam and a downlink beam. When using a first beam for communication and transmission, the relay node restricts, based on the fourth information, use of the downlink beam that corresponds to the first beam.

In some embodiments, the first beam is a beam used by an MT in the relay node to communicate with the parent node.

In some embodiments, the downlink beam is a beam used by a DU in the relay node to communicate with a corresponding terminal.

In some embodiments, the relay node obtains a first condition, where the first condition indicates to lift a restriction on the downlink beam. The relay node lifts the restriction on the downlink beam when the relay node determines that the first condition is satisfied.

In some embodiments, the first condition is obtained by the relay node from a donor node. Alternatively, the first condition is obtained by the relay node from the parent node.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, if the first condition includes that the second signal exists in the slot, a resource type of the slot is considered as a hard resource. Alternatively, if the first condition includes that the second signal exists in the first symbol in the slot, the restriction on the downlink beam that corresponds to the beam on the first symbol is lifted. The second signal includes one or more of the SS/PBCH block, the PDCCH common search space set and the periodic CSI-RS. When a resource of the DU is configured as a hard resource, sending and/or receiving on the resource in any cell of an IAB-DU may not be restricted. The restriction includes the restriction on the downlink beam.

In some embodiments, when determining that one of first cells satisfies the first condition, the relay node may lift a restriction on a downlink beam that corresponds to a cell that satisfies a second condition. Alternatively, when determining that one of first cells satisfies the first condition, the relay node lifts a restriction on downlink beams that correspond to all the first cells. The downlink beams that correspond to all the cells in the first cell are the same.

In some embodiments, the method further includes: The relay node obtains first information, where the first information includes an identifier of at least one beam that is used to send a first signal. The relay node sends second information to the parent node based on the first information, where the second information includes a correspondence between the beam and desired power spectrum density PSD. The relay node receives third information sent by the parent node, where the third information indicates the relay node to determine transmit power based on information sent by using the beam.

In some embodiments, the first information is obtained by the relay node from the donor node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by the DU in the relay node.

In some embodiments, each beam in the beam corresponds to one or more desired PSD ranges.

In some embodiments, alternatively, each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam: and the first case is determined based on at least one parameter.

In some embodiments, the parameter includes at least one of the following:

a setting of a guard band between frequency bands during communication and transmission, a value of the guard band, a quantity of guard symbols, an undesired beam set, a quantity of TRxs of a carrier, a setting of a downlink received power interval of the mobile terminal MT in the relay node, a maximum quantity of demodulation reference signal DMRS ports for downlink scheduling of the MT, or a maximum quantity of DMRS ports for uplink scheduling of the MT.

In some embodiments, the parameter may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

According to a fourth aspect, a resource configuration method is provided. The method may be performed by a second communication apparatus. The second communication apparatus may be a communication device or a communication apparatus that can support the communication device in implementing a function required by the method, for example, a chip system.

In some embodiments, the communication device is a parent node, for example, a first parent node, in a plurality of parent nodes connected to a relay node for description. The method includes:

In some embodiments, the parent node sends fourth information to the relay node, where the fourth information includes a restriction relationship between an uplink beam and a downlink beam.

In some embodiments, the parent node may further determine a first condition, and notify the relay node of the first condition. If the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, the method further includes: The parent node sends first information to the relay node, where the first information includes an identifier of at least one beam that is used to send a first signal. The parent node receives second information from the relay node, where the second information includes a correspondence between the identifier of the beam and desired power spectrum density PSD. The parent node sends third information to the relay node based on the second information, where the third information indicates the relay node to determine transmit power based on information sent by using the beam.

In some embodiments, the fourth information may be determined by the parent node based on the second information.

In some embodiments, the beam is a beam used by an MT in the relay node to communicate with the parent node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by a DU in the relay node.

In some embodiments, each beam in the beam corresponds to one or more desired PSD ranges, or each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam: and the first case is determined based on at least one parameter.

In some embodiments, the parameter includes at least one of the following: a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

In some embodiments, the parameter may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

According to a fifth aspect, an embodiment of this application provides a communication apparatus. The communication apparatus has a function of implementing behavior in the method embodiment of the first aspect. The function may be implemented by hardware, or may be implemented by hardware by executing corresponding software. The hardware or the software includes one or more modules corresponding to the foregoing function.

In some embodiments, a transceiver module and a processing module are included.

In some embodiments, the transceiver module is configured to obtain first information, where the first information includes an identifier of at least one beam that is used to send a first signal.

In some embodiments, the processing module is configured to send second information to a parent node based on the first information, where the second information includes a correspondence between the beam and desired power spectrum density PSD.

In some embodiments, the transceiver module is further configured to receive third information sent by the parent node, where the third information indicates the relay node to determine transmit power based on information sent by using the beam.

In some embodiments, the beam is a beam used by an MT in the relay node to communicate with the parent node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by a DU in the relay node.

In some embodiments, each beam in the beam corresponds to one or more desired PSD ranges, or each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam; and the first case is determined based on at least one parameter.

In some embodiments, the parameter includes at least one of the following:

a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

In some embodiments, the transceiver module is further configured to receive fourth information sent by the parent node, where the fourth information includes a restriction relationship between an uplink beam and a downlink beam. The processing module is further configured to: when the beam is used for the communication and transmission, restrict, based on the fourth information, use of the downlink beam that corresponds to the beam.

In some embodiments, the downlink beam is a beam used by the DU in the relay node to communicate with a corresponding terminal.

In some embodiments, the transceiver module is further configured to obtain a first condition, where the first condition indicates to lift a restriction on the downlink beam. The processing module is further configured to lift the restriction on the downlink beam when it is determined that the first condition is satisfied.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, if the first condition includes that the second signal exists in the slot, a resource type of the slot is considered as a hard resource. Alternatively, if the first condition includes that the second signal exists in the first symbol in the slot, the restriction on the downlink beam that corresponds to the beam in the first symbol is lifted. The second signal includes one or more of the SS/PBCH block, the PDCCH common search space set, and the periodic CSI-RS. When a resource of the DU is configured as a hard resource, sending and/or receiving on the resource in any cell of an IAB-DU may not be restricted. The restriction includes the restriction on the downlink beam.

In some embodiments, the processing module may be specifically configured to: when it is determined that one of first cells satisfies the first condition, lift a restriction on a downlink beam that corresponds to a cell that satisfies a second condition: or when it is determined that one of first cells satisfies the first condition, lift a restriction on downlink beams that correspond to all the first cells, where the downlink beams that correspond to all the first cells are the same.

According to a sixth aspect, an embodiment of this application provides another communication apparatus. The communication apparatus has a function of implementing behavior in the method embodiment of the second aspect. The function may be implemented by hardware, or may be implemented by hardware by executing corresponding software. The hardware or the software includes one or more modules corresponding to the foregoing function.

In some embodiments, a transceiver module and a processing module are included.

In some embodiments, the transceiver module is configured to send first information to a relay node, where the first information includes an identifier of at least one beam that is used to send a first signal: and receive second information from the relay node, where the second information includes a correspondence between the identifier of the beam and desired power spectrum density PSD.

In some embodiments, the processing module is configured to send third information to the relay node based on the second information, where the third information indicates the relay node to determine transmit power based on information sent by using the beam.

In some embodiments, the beam is a beam used by an MT in the relay node to communicate with a parent node.

In some embodiments, the correspondence between the beam and the desired PSD includes the beam and PSD information associated with the beam, or the PSD and beam information associated with the PSD.

In some embodiments, the first signal includes an uplink sounding reference signal SRS, and the reference signal may be sent by an IAB-MT.

In some embodiments, the first signal further includes a downlink reference signal, for example, a channel state information reference signal CSI-RS or a synchronization signal SSB. The first signal may be sent by a DU in the relay node.

In some embodiments, each beam in the beam corresponds to one or more desired PSD ranges, or each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam; and the first case is determined based on at least one parameter.

In some embodiments, the parameter includes at least one of the following: a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

In some embodiments, the parameter may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

In some embodiments, the parent node may further send fourth information to the relay node, where the fourth information includes a restriction relationship between an uplink beam and a downlink beam.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, if the first condition includes that the second signal exists in the slot, a resource type of the slot is considered as a hard resource. Alternatively, if the first condition includes that the second signal exists in the first symbol in the slot, the restriction on the downlink beam that corresponds to the beam in the first symbol is lifted. The second signal includes one or more of the SS/PBCH block, the PDCCH common search space set, and the periodic CSI-RS. When a resource of the DU is configured as a hard resource, sending and/or receiving on the resource in any cell of an IAB-DU may not be restricted. The restriction includes the restriction on the downlink beam.

According to a seventh aspect, an embodiment of this application provides a communication apparatus. The communication apparatus has a function of implementing behavior in the method embodiment of the first aspect. The function may be implemented by hardware, or may be implemented by hardware by executing corresponding software. The hardware or the software includes one or more modules corresponding to the foregoing function.

In some embodiments, a transceiver module and a processing module are included.

In some embodiments, the transceiver module is configured to receive fourth information sent by a parent node, where the fourth information includes a restriction relationship between an uplink beam and a downlink beam.

In some embodiments, the processing module is configured to: when a first beam is used for communication and transmission, restrict, based on the fourth information, use of the downlink beam that corresponds to the first beam.

In some embodiments, the first beam is a beam used by an MT in a relay node to communicate with the parent node.

In some embodiments, the downlink beam is a beam used by a DU in the relay node to communicate with a corresponding terminal.

In some embodiments, the relay node obtains a first condition, where the first condition indicates to lift a restriction on the downlink beam. The relay node lifts the restriction on the downlink beam when the relay node determines that the first condition is satisfied.

In some embodiments, the first condition is obtained by the relay node from a donor node. Alternatively, the first condition is obtained by the relay node from the parent node.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted.

In some embodiments, the second signal includes one or more of an SS/PBCH block, a PDCCH common search space set, and a periodic CSI-RS.

In some embodiments, when determining that one of first cells satisfies the first condition, the relay node may lift a restriction on a downlink beam that corresponds to a cell that satisfies a second condition. Alternatively, when determining that one of first cells satisfies the first condition, the relay node lifts a restriction on downlink beams that correspond to all the first cells. The downlink beams that correspond to all the cells in the first cell are the same.

In some embodiments, the method further includes: The relay node obtains first information, where the first information includes an identifier of at least one beam that is used to send a first signal. The relay node sends second information to the parent node based on the first information, where the second information includes a correspondence between the beam and desired power spectrum density PSD. The relay node receives third information sent by the parent node, where the third information indicates the relay node to determine transmit power based on information sent by using the beam.

In some embodiments, the first information is obtained by the relay node from the donor node.

In some embodiments, the correspondence between the beam and the desired PSD includes the beam and PSD information associated with the beam, or the PSD and beam information associated with the PSD.

In some embodiments, the first signal includes an uplink sounding reference signal SRS.

In some embodiments, each beam in the beam corresponds to one or more desired PSD ranges.

In some embodiments, alternatively, each PSD range corresponds to one or more beams.

In some embodiments, the first information further includes an association relationship between a first case and the first signal that corresponds to the beam: and the first case is determined based on at least one parameter.

In some embodiments, the second information further includes an association relationship between the first case and the PSD that corresponds to the beam: and the first case is determined based on at least one parameter.

In some embodiments, the parameter includes at least one of the following:

a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

The parameter in this application may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

According to an eighth aspect, an embodiment of this application provides another communication apparatus. The communication apparatus has a function of implementing behavior in the method embodiment of the second aspect. The function may be implemented by hardware, or may be implemented by hardware by executing corresponding software. The hardware or the software includes one or more modules corresponding to the foregoing function.

In some embodiments, a transceiver module and a processing module are included.

In some embodiments, the transceiver module is configured to send fourth information to the relay node, where the fourth information includes a restriction relationship between an uplink beam and a downlink beam.

In some embodiments, a parent node may further determine a first condition, and notify the relay node of the first condition. If the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some embodiments, the parent node sends first information to the relay node, where the first information includes an identifier of at least one beam that is used to send a first signal. The parent node receives second information from the relay node, where the second information includes a correspondence between the identifier of the beam and desired power spectrum density PSD. The parent node sends third information to the relay node based on the second information, where the third information indicates the relay node to determine transmit power based on information sent by using the beam.

In some embodiments, the fourth information may be determined by the parent node based on the second information.

In some embodiments, the beam is a beam used by an MT in the relay node to communicate with the parent node.

In some embodiments, the correspondence between the beam and the desired PSD includes the beam and PSD information associated with the beam, or the PSD and beam information associated with the PSD.

In some embodiments, the first signal includes an uplink sounding reference signal SRS.

In some embodiments, each beam in the beam corresponds to one or more desired PSD ranges, or each PSD range corresponds to one or more beams.

In some embodiments, the first information further includes an association relationship between a first case and the first signal that corresponds to the beam; and the first case is determined based on at least one parameter.

In some embodiments, the second information further includes an association relationship between the first case and the PSD that corresponds to the beam: and the first case is determined based on at least one parameter.

In some embodiments, the parameter includes at least one of the following: a setting of a guard band between frequency bands during communication and transmission, a value of the guard band, a quantity of guard symbols, an undesired beam set, a quantity of TRxs of a carrier, desired downlink transmit power of the mobile terminal MT in the relay node, a desired uplink transmit power PSD range of the MT, a maximum quantity of demodulation reference signal DMRS ports for downlink scheduling of the MT, or a maximum quantity of DMRS ports for uplink scheduling of the MT.

In some embodiments, the parameter may be configured or indicated by the parent node or a donor base station. One parameter set of one or more of the parameters may be configured, and each parameter set may use one ID identifier. An IAB node may be configured with a plurality of parameter sets and corresponding ID identifiers. The parent node may indicate a parameter set ID of a current application by using MAC-CE signaling or DCI signaling.

According to a ninth aspect, a communication apparatus is provided. The apparatus includes a processor and a memory. The memory is configured to store a computing program or instructions, and the processor is coupled to the memory. When the processor executes the computer program or the instructions, the apparatus is enabled to perform the method according to any one of the first aspect or the possible implementations of the first aspect, or the apparatus is enabled to perform the method according to any one of the third aspect or the third aspect. The communication apparatus may be a first apparatus, or an apparatus that can support the first apparatus in implementing a function required by the method according to any one of the first aspect or the possible implementations of the first aspect, or an apparatus that can support the first apparatus in implementing a function required by the method according to the third aspect, for example, a chip system. For example, the communication apparatus may be a terminal device or a part of a component (for example, a chip) in the terminal device. The terminal device that is involved may include various handheld devices, vehicle-mounted devices, wearable devices, or computing devices that have a wireless communication function, or other processing devices connected to a wireless modem. The terminal may be a mobile station (MS), a subscriber unit (subscriber unit), a cellular phone, a smartphone, a wireless data card, a personal digital assistant (PDA) computer, a tablet computer, a wireless modem, a handset, a laptop computer, a machine type communication (MTC) terminal, or the like.

According to a tenth aspect, a communication apparatus is provided. The apparatus includes a processor and a memory. The memory is configured to store a computing program or instructions, and the processor is coupled to the memory. When the processor executes the computer program or the instructions, the apparatus is enabled to perform the method according to any one of the second aspect or the possible implementations of the second aspect, or the apparatus is enabled to perform the method according to any one of the fourth aspect or the fourth aspect. The communication apparatus may be a second apparatus, or an apparatus that can support the second apparatus in implementing a function required by the method according to any one of the second aspect or the possible implementations of the second aspect, or an apparatus that can support the second apparatus in implementing a function required by the method according to the fourth aspect, for example, a chip system. For example, the communication apparatus may be a network device. The network device in embodiments of this application may include macro base stations, micro base stations (also referred to as small cells), relay stations, access points, or the like in various forms. In systems that use different radio access technologies, names of the network device may vary, such as a BTS (base transceiver station) in a GSM (Global System for Mobile Communications) or a CDMA (Code Division Multiple Access) network, an NB (NodeB) in a WCDMA (Wideband Code Division Multiple Access), and an eNB or an eNodeB (Evolved NodeB) in LTE (Long Term Evolution). Alternatively, the network device may be a radio controller in a CRAN (Cloud Radio Access Network) scenario. Alternatively, the network device may be a base station device in a future 5G network or a network device in a future evolved PLMN network. The network device may alternatively be a wearable device or a vehicle-mounted device. The network device may alternatively be a transmission reception point (TRP).

According to an eleventh aspect, a terminal is provided. The terminal may include the apparatus according to the fifth aspect or the seventh aspect. In some embodiments, the apparatus may be, for example, a smart home device, an intelligent manufacturing device, or an intelligent transportation device, such as a vehicle, an uncrewed aerial vehicle, an uncrewed transport vehicle, a car, a vehicle, or a robot. Alternatively, the apparatus may be a mouse, a keyboard, a wearable device, a TWS headset, or the like.

According to a twelfth aspect, this application provides a chip. The chip is connected to a memory, and is configured to read and execute a computer program or instructions stored in the memory, to implement the method according to any one of the first aspect or the possible implementations of the first aspect, or implement the method according to any one of the second aspect or the possible implementations of the second aspect, or implement the method according to any one of the third aspect or the possible implementations of the third aspect, or implement the method according to any one of the fourth aspect or the possible implementations of the fourth aspect.

According to a thirteenth aspect, a computer-readable storage medium is provided. The computer-readable storage medium stores a computer program or instructions. When the computer program or the instructions are executed by an apparatus, the apparatus is enabled to implement the method according to any one of the first aspect or the possible implementations of the first aspect, or implement the method according to any one of the second aspect or the possible implementations of the second aspect, or implement the method according to any one of the third aspect or the possible implementations of the third aspect, or implement the method according to any one of the fourth aspect or the possible implementations of the fourth aspect.

According to a fourteenth aspect, this application provides a computer program product. The computer program product includes a computer program or instructions. When the computer program or the instructions are executed by an apparatus, the apparatus is enabled to implement the method according to any one of the first aspect or the possible implementations of the first aspect, or implement the method according to any one of the second aspect or the possible implementations of the second aspect, or implement the method according to any one of the third aspect or the possible implementations of the third aspect, or implement the method according to any one of the fourth aspect or the possible implementations of the fourth aspect.

DETAILED DESCRIPTION

Figure 1:
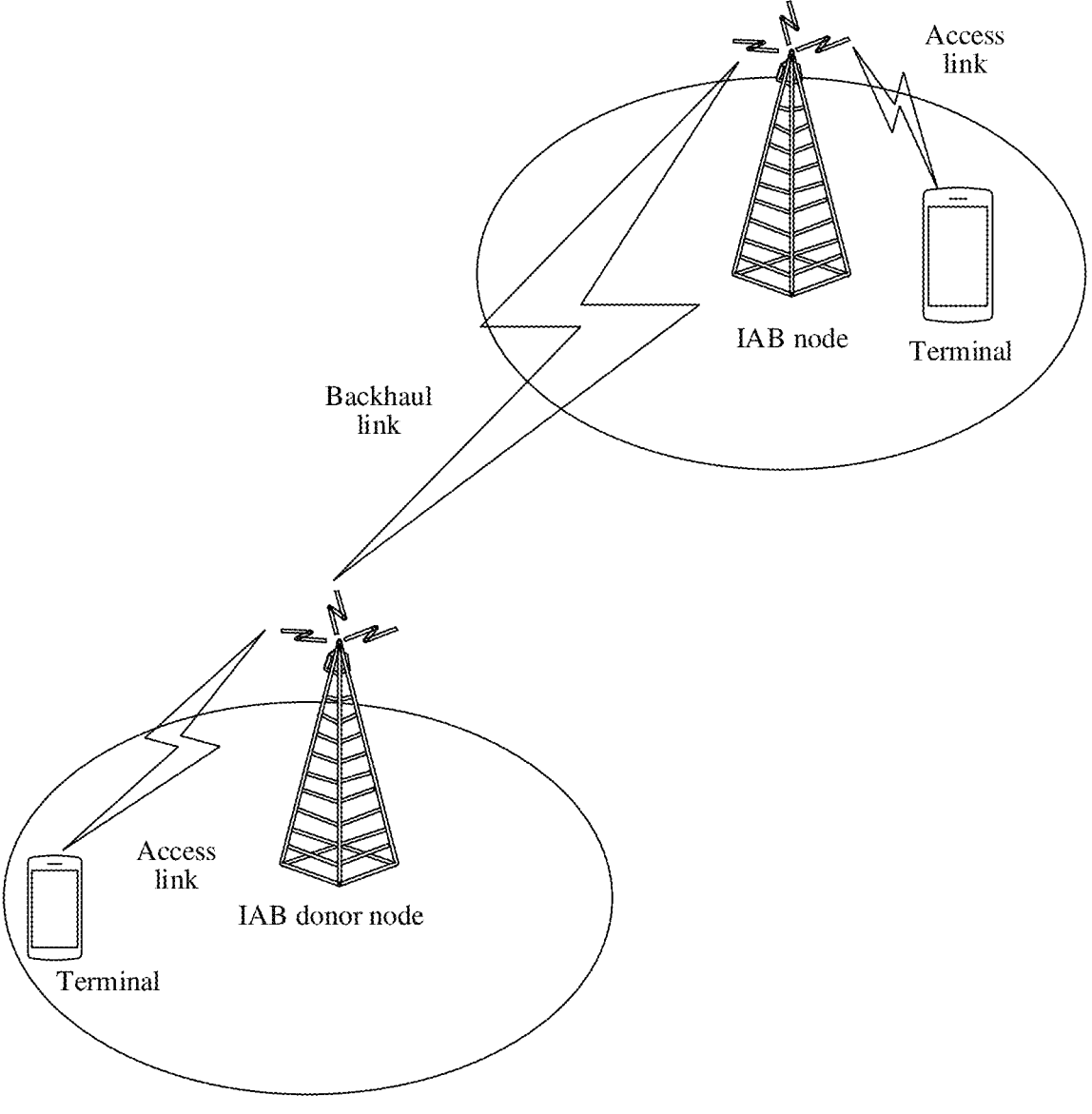
FIG. 1 is a schematic diagram of a structure of an IAB system according to an embodiment of this application.

To make objectives, technical solution, and advantages of embodiments of this application clearer, the following further describes embodiments of this application in detail with reference to the accompanying drawings.

Before this application is described, some terms in embodiments of this application are first briefly explained and described, to help a person skilled in the art have a better understanding.

(1) Beam:

The beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams.

In some embodiments, a plurality of beams having a same communication feature or similar communication features may be considered as one beam. One beam may correspond to one or more antenna ports, and is used to transmit a data channel, a control channel, a sounding signal, and the like. For example, a transmit beam may be signal strength distribution formed in different directions in space after signals are transmitted by an antenna, and a receive beam may be signal strength distribution in different directions in space of radio signals received from an antenna. It may be understood that one or more antenna ports forming one beam may also be considered as one antenna port set.

When a low frequency band or an intermediate frequency band is used, the signals may be sent omnidirectionally or sent at a wide angle. However, when a high frequency band is used, because of a small carrier wavelength of a high frequency communication system, an antenna array including a plurality of antenna elements may be disposed at a transmitting end and a receiving end. The transmitting end sends signals by using a specific beamforming weight, so that the sent signals form a beam having spatial directivity.

In addition, the receiving end receives the signals through the antenna array by using a specific beamforming weight. In this way, received power of the signals at the receiving end can be improved, to reduce a path loss.

In a protocol, a TCI state ID or an SRI is generally used to identify a beam. In some possible implementations, the beam is indirectly represented by using a reference signal resource identifier or a synchronization signal index.

(2) Quasi-Co-Location (QCL):

The QCL indicates that a plurality of resources have one or more same or similar communication features. For the plurality of resources having a QCL relationship, a same communication configuration or similar communication configurations may be used. For example, if two antenna ports have the QCL relationship, a channel large-scale property of transmitting one symbol by one port may be inferred from a channel large-scale property of transmitting one symbol by the other port. The large-scale property may include delay spread, an average delay, Doppler spread, a Doppler frequency shift, an average gain, a receive parameter, a receive beam number of a terminal device, a transmission/reception channel correlation, a reception angle of arrival, a spatial correlation of a receiver antenna, a dominant angle of arrival (AoA), an average angle of arrival, AoA spread, and the like.

During application, a quasi-co-location indication may indicate whether at least two groups of antenna ports have the QCL relationship. That the quasi-co-location indication indicates whether the at least two groups of antenna ports have the QCL relationship may be understood as follows: The quasi-co-location indication indicates whether channel state information reference signals (CSI RSs) sent by the at least two group antenna ports are from a same transmission point, or the quasi-co-location indication indicates whether channel state information reference signals (CSI RSs) sent by the at least two group antenna ports are from a same beam group.

(3) Transmission Configuration Indicator (TCI):

The TCI is a field that is in downlink control information (DCI) and that indicates a QCL relationship between antenna ports for a physical downlink shared channel (PDSCH).

The TCI may be configured by a higher layer, for example, a radio resource control (RRC) layer. In configuration signaling, the TCI may be referred to as a TCI state. The TCI state is an information structure, and includes beam-related information. After being configured by the RRC layer, a base station may send a media (medium) access control (MAC) control element (CE) (MAC-CE) to activate one or more TCI states. The base station may further send downlink control information (DCI) to indicate one of the plurality of activated TCI states.

The higher layer in a protocol may configure the QCL by using the TCI state. A parameter of the TCI state may be used to configure a QCL relationship between one or two downlink reference signals and PDSCH demodulation reference signal (DMRS). The TCI may include one or two QCL relationships. Because the QCL may represent a consistency relationship between a current signal/channel to be received (or sent) by a terminal device and a known reference signal, if there is the QCL relationship, the terminal device may inherit a parameter previously used when the reference signal is received (or sent), to receive (or send) the signal/channel that is to arrive.

During application, if the TCI state includes information of a QCL Type-D identifier, the TCI state may indicate a beam. If the TCI state includes information about a QCL Type-A identifier, a QCL Type-B identifier, or a QCL Type-C identifier, the TCI state may indicate information such as a time domain offset and a frequency domain offset (excluding space domain information), and is generally used to assist the terminal device in data receiving and demodulation. During implementation, it may be considered that when two TCI state configurations use a same QCL Type-D source reference signal, the two TCI states have the QCL relationship, or the two TCI states may be considered to use a same beam.

(4) Reference Signal (RS):

Based on a long term evolution LTE/NR protocol, at a physical layer, uplink communication includes transmission of an uplink physical channel and an uplink signal. The uplink physical channel includes a random access channel (PRACH), an uplink control channel (PUCCH), an uplink data channel (PUSCH), and the like. The uplink signal includes a channel sounding signal SRS, an uplink control channel demodulation reference signal (PUCCH-DMRS), an uplink data channel demodulation reference signal PUSCH-DMRS, an uplink phase noise tracking signal (PTRS), an uplink positioning signal (uplink positioning RS), and the like. Downlink communication includes transmission of a physical downlink channel and a downlink signal. The downlink physical channel includes a broadcast channel (PBCH), a downlink control channel (PDCCH), a downlink data channel (PDSCH), and the like. The downlink signal includes a primary synchronization signal (PSS)/secondary synchronization signal (SSS), a downlink control channel demodulation reference signal PDCCH-DMRS, a downlink data channel demodulation reference signal PDSCH-DMRS, a phase noise tracking signal PTRS, a channel state information reference signal (CSI-RS), a cell reference signal (CRS) (not available in NR), a time/frequency tracking reference signal (TRS) (not available in LTE), an LTE/NR positioning signal (positioning RS), and the like.

To improve spectrum utilization, base stations are to be deployed more densely in the future. However, because deployment costs of optical fibers are high, a connection is established to a core network through a backhaul link of a wireless relay node (RN), to reduce some deployment costs of the optical fibers.

The relay node may establish a wireless backhaul link to one or more parent nodes, and access the core network through the parent node. The parent node may control (for example, perform data scheduling, timing modulation, and power control on) the relay node by using a plurality of pieces of signaling. In addition, the relay node may establish a connection to one or more child nodes, and provide a service for the one or more child nodes. The parent node of the relay node may be a base station, or may be another relay node. The child node of the relay node may be a terminal, or may be another relay node. In some cases, the parent node may also be referred to as an upstream node, and the child node may also be referred to as a downstream node.

To improve the spectrum utilization, the backhaul link and an access link may share a same frequency band. This solution is also referred to as an in-band relay. The in-band relay is generally subject to a half-duplex constraint. Specifically, the relay node cannot send a downlink signal to the child node of the relay node when the relay node receives a downlink signal sent by the parent node of the relay node. The relay node cannot send an uplink signal to the parent node of the relay node when the relay node receives an uplink signal sent by the child node of the relay node. An in-band relay solution of a new generation wireless communication system (NR) is referred to as IAB. Correspondingly, the relay node is referred to as an IAB node.

FIG. 1 shows an IAB system. An IAB node (which may be considered as a wireless backhaul device) provides wireless access and wireless backhaul of an access service for a terminal. An IAB donor node (IAB donor node, which may be considered as a donor base station) provides a wireless backhaul function for the IAB node and provides an interface between the terminal and a core network. The IAB node is connected to the IAB donor node through a wireless backhaul link, so that the terminal served by the IAB node is connected to the core network.

It should be noted that, in a diagram of a network architecture shown in FIG. 1, although a terminal side device, a wireless backhaul device, and the donor base station are shown, the network architecture may not be limited to the terminal side device, the wireless backhaul device, and the donor base station. For example, a core network device or a device that is configured to bear a virtualized network function may be further included. It is clear to a person of ordinary skill in the art, and details are not described in detail herein. In addition, in the system shown in FIG. 1, although one terminal side device, one wireless backhaul device, and one donor base station are shown, a quantity of terminal side devices, a quantity of wireless backhaul devices, and a quantity of donor base stations are not limited in the network architecture. For example, a plurality of terminal side devices, a plurality of wireless backhaul devices, and a plurality of donor base stations may alternatively be included. In the following descriptions, an example in which the wireless backhaul device is the IAB node is used.

The donor node is a node that may access the core network, or a network device of a radio access network. For example, the donor node is an anchor base station (or the donor base station or the donor node mentioned above) that may access a network. The anchor base station is responsible for processing data at a packet data convergence protocol (PDCP) layer, receiving data from the core network and forwarding the data to the relay node, or receiving data from the relay node and forwarding the data to the core network. The donor node may generally access the network in a wired manner, for example, through an optical fiber.

The network device may be referred to as a base station, or may be referred to as a radio access network (RAN) node (or device). For example, the network device may be a next-generation NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In embodiments of this application, a name of the network device may be a relay node (RN), a relay transmission reception point (rTRP), an IAB node, or the like: and the parent node of the relay node may be a gNB (including a gNB-DU, a gNB-CU, and the like), or may be another relay node.

For example, the network device in embodiments of this application may be divided into a central unit (CU) and at least one distributed unit (DU). The CU and the DU are relative. The CU may be configured to manage or control the at least one DU. In other words, the CU is connected to the at least one DU. In this structure, protocol layers of the network device in a communication system may be separated. A part of the protocol layers is controlled by the CU in a centralized manner, and functions of a part or all of remaining protocol layers are distributed in the DU. The CU controls the DU in a centralized manner. For example, the network device is the gNB. Protocol layers of the gNB include a radio resource control (RRC) layer, a service data adaptation protocol (SDAP) layer, a packet data convergence protocol (PDCP) layer, a radio link control (RLC) layer, a media access control (MAC) sublayer, and a physical layer (PHY). For example, the CU may be configured to implement functions of the RRC layer, the SDAP layer, and the PDCP layer, and the DU may be configured to implement functions of the RLC layer, the MAC layer, and the physical layer. Physically, the CU and the DU may be connected through an optical fiber. Logically, there is a specifically defined F1 interface used for communication between the CU and the DU. From a function perspective, the CU is mainly responsible for radio resource control and configuration, cross-cell mobility management, bearer management, and the like, and the DU is mainly responsible for scheduling and physical signal generation and sending. For example, the CU sends a configuration to the DU (where a direction is similar to a downlink transmission direction). An F1-AP data packet generated by the CU is encapsulated into an IP packet, and is transmitted between a plurality of hop nodes over an air interface. After the data packet arrives at a target IAB node, the data packet is processed at a target IAB-MT adaptation layer, and then forwarded to a local IAB-DU module for processing. Finally, the F1-AP data packet is parsed in the DU. Protocol stacks included in the CU and the DU are not specifically limited in embodiments of this application.

Figure 2:
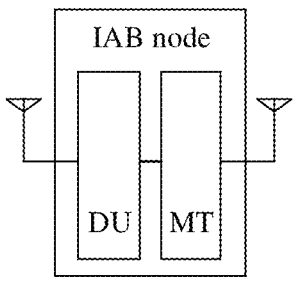
FIG. 2 is a schematic diagram of a structure of an IAB node according to an embodiment of this application.
Figure 3:
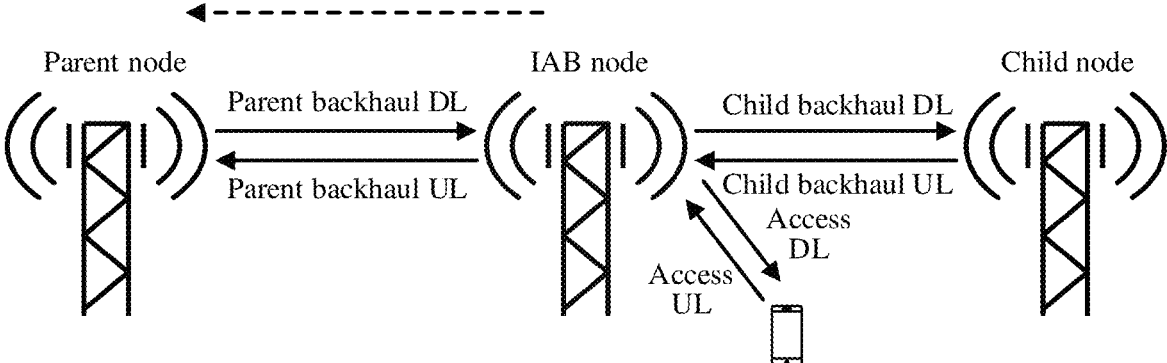
FIG. 3 is a schematic diagram of a backhaul link and an access link according to an embodiment of this application.

FIG. 2 is a schematic diagram of a structure of an IAB node. An IAB node in NR may be divided into two parts: a mobile terminal (MT) and a DU. The MT may also be understood as a component similar to a terminal in the IAB node. The DU is relative to a central unit (CU) function of a network device. Therefore, it may also be considered that the IAB node includes an MT function and a DU function. For ease of description, in the following, the MT function is referred to as an MT, and the DU function is referred to as a DU. Because the MT is similar to a function of a common terminal, it may be understood that the MT is used for communication between the IAB node and a parent node. The DU is relative to the central unit (CU) function of the network device, and the DU is used for communication between the IAB node and a child node. It should be understood that the parent node may be a base station or another IAB node, and the child node may be a terminal or another IAB node. A link for communication between the MT and the parent node is referred to as a parent backhaul link. A link for communication between the DU and the child IAB node is referred to as a child backhaul link. A link for communication between the DU and a subordinate terminal is referred to as an access link. In some embodiments, the child backhaul link is also referred to as an access link. The parent backhaul link includes a parent backhaul uplink (UL) and a parent backhaul downlink (DL), the child backhaul link includes a child backhaul UL and a child backhaul DL, and the access link includes an access UL and an access DL, as shown in FIG. 3.

Figure 4:
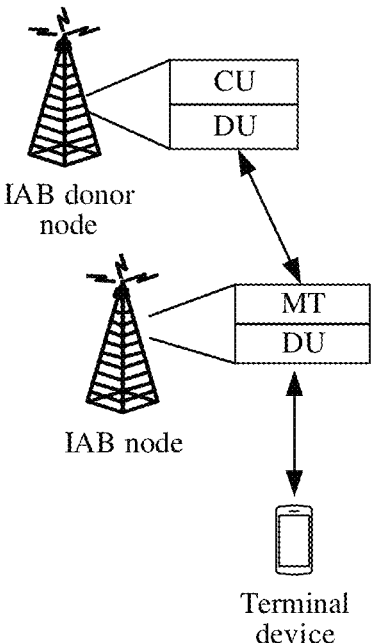
FIG. 4 is a schematic diagram of IAB node communication according to an embodiment of this application.

If the network device is a relay device, especially the IAB node, the network device may include the MT function and the DU function. To be specific, the IAB node communicates with the parent node through the MT. The DU is a base station function module of the IAB node, is configured to implement functions of an RLC layer, a MAC layer, and a physical layer, and is mainly responsible for scheduling and physical signal generation and sending. In other words, the IAB node communicates with the child node and the terminal through the DU, as shown in FIG. 4. Both the MT and the DU in the IAB node have complete transceiver modules, and there is an interface between the MT and the DU. However, it should be noted that the MT and the DU are logical modules. In practice, the MT and the DU may share some submodules, for example, a transceiver antenna and a baseband processing module, as shown in FIG. 4.

When the IAB node works normally, resource multiplexing is performed on the access link and the backhaul link (that is, the MT and the DU) in a manner of time division multiplexing (TDM), space division multiplexing (SDM), or frequency division multiplexing (FDM). A TDM mode is a mode in which the backhaul link and the access link work at different moments. If receiving or sending is performed on the access link and the backhaul link at the same time, a working mode of the backhaul link and the access link is an SDM mode. If both receiving and sending are performed on the access link or the backhaul link at the same time, a working mode of the backhaul link and the access link is a full-duplex mode. Generally, because impact of signal sending on signal receiving needs to be additionally considered in full-duplex transmission, the full-duplex mode has a higher requirement on hardware.

A TDM scenario is used as an example. The backhaul link and the access link work at different moments. Therefore, the IAB node needs to perform switching between receiving and sending on the backhaul link and receiving and sending on the access link. When seamless switching is performed on the backhaul link and the access link, in other words, when symbols of the access link and the backhaul link are consecutive, the IAB node has high resource utilization. However, during implementation, due to various factors such as power amplifier on/off time, a transmission distance, and non-ideal synchronization, seamless switching cannot be implemented on the backhaul link and the access link. In this case, the IAB node needs to determine a set of available/unavailable symbols of the backhaul link and the access link.

Therefore, an MT resource and a DU resource may be configured. The MT resource may be configured to be of three types: downlink (D), uplink (U), and flexible (F). "Downlink" indicates that the resource is used for downlink transmission. "Uplink" indicates that the resource is used for uplink transmission. "Flexible" indicates that a transmission direction of the MT depends on a further indication (generally dynamically indicated by using physical layer signaling) of the parent node. The DU resource may also be configured to be of the three types: uplink, downlink, and flexible, which indicate three transmission directions. Further, a DU uplink resource, a DU downlink resource, and a DU flexible resource may further be classified into two types: hard and soft. A DU hard resource indicates a resource that is always available to the DU. A DU soft resource indicates that resource availability to the DU depends on an indication of the parent node. The DU has another resource type: not available (NA), and the resource type indicates that the DU cannot use the resource.

It can be learned that the MT resource has three types, and the DU resource has seven types. A resource configuration of the IAB node may be determined based on an MT resource configuration and a DU resource configuration. For example, the resource type and a corresponding transmission direction of the DU may be transmitted between the CU and the DU by using F1-AP interface signaling. For example, in "GNB-DU RESOURCE CONFIGURATION", including "gNB-DU Cell Resource Configuration", defined in TS 38.473 9.2.9.3, the DU resource is specifically configured.

"DUF Slot Configuration Item" in the "gNB-DU Cell Resource Configuration" is used to configure the transmission direction of the DU, including uplink, downlink, and flexible. A configuration related to "HSNA Slot Configuration list" in the "gNB-DU Cell Resource Configuration" is used to configure attributes (hard, soft, and not available) of the DU resource.

Figure 5:
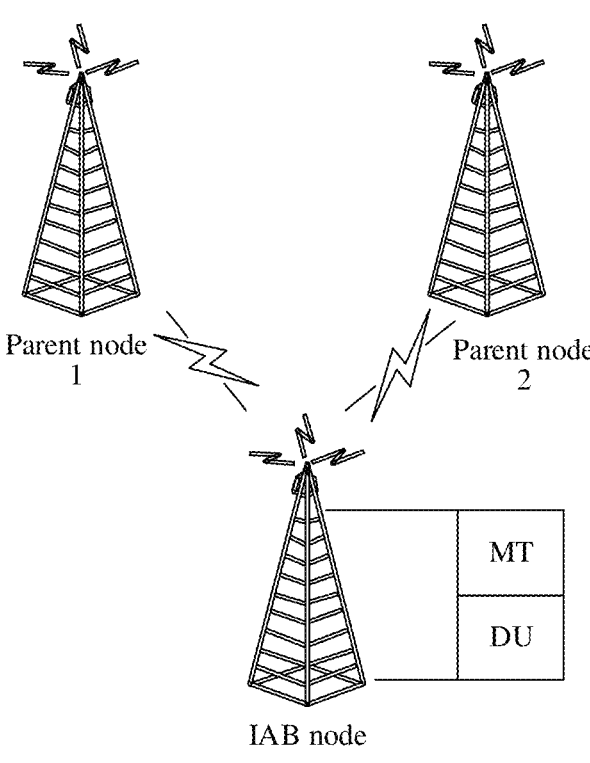
FIG. 5 is a schematic diagram of a network architecture of a communication system to which an embodiment of this application is applicable.

Further, to determine availability of the soft resource on the IAB-DU, the parent node may provide an indication by sending DCI 2_5. For example, a plurality of parent nodes of the IAB node may respectively indicate schedulable DU soft resources. FIG. 5 is used as an example. A parent node 1 and a parent node 2 each obtain soft resources of a plurality of cells of a DU in an IAB node. The parent node 1 and the parent node 2 indicate, based on the DCI 2_5, which soft resources of specific cells in the plurality of cells in the DU are available. When a downlink symbol, an uplink symbol, or a flexible symbol is configured as a hard resource, the DU may perform sending on the downlink symbol, receiving on the uplink symbol, or sending or receiving on the flexible symbol. When a downlink symbol, an uplink symbol, or a flexible symbol is configured as a soft resource, the DU may perform only sending, receiving, or sending or receiving on the symbol. For example, an IAB-MT does not perform sending or receiving on the symbol. For another example, the IAB-MT performs receiving or sending on the symbol, but sending or receiving of the IAB-DU on the symbol is not changed. For another example, the IAB-MT detects the DCI 2_5 and the DU soft resource is indicated as available. It should be understood that, when a symbol is configured as not available, the IAB-DU neither performs sending nor receiving on the symbol.

The foregoing describes a resource configuration method for the IAB node in the network architecture shown in FIG. 1. However, in a possible application scenario, FIG. 5 is a schematic diagram of a network architecture of a dual-connected IAB node. The dual-connected IAB node means that there are two nodes that provide wireless backhaul link resources for the IAB node. In other words, the IAB node has two parent nodes. FIG. 5 uses an example in which the two parent nodes are the parent node 1 and the parent node 2. Certainly, the parent node in FIG. 5 may be another IAB node, may be a donor node, or may be a common base station. If the parent node is the IAB node, the parent node may also include an MT function and a DU function. If the parent node is the donor node, the parent node may also include a CU function and a DU function.

In a scenario of the dual-connected IAB node, if the current resource configuration method for the IAB node is still used, to be specific, a plurality of parent nodes may respectively indicate schedulable DU soft resources, in other words, the plurality of parent nodes each indicate a schedulable DU soft resource independently, the plurality of parent nodes may schedule the IAB node on a same resource or different resources. However, the plurality of parent nodes do not know which schedulable DU soft resources are indicated by each other. As a result, partition efficiency of the DU soft resources is low. For example, the plurality of parent nodes schedule the IAB on a plurality of different DU soft resources, and the plurality of DU soft resources do not overlap (with no intersection). In this case, resources that can be used for the IAB-DU are very limited. This reduces spectral efficiency of the IAB node, and may even cause data congestion on the IAB node.

Figure 6:
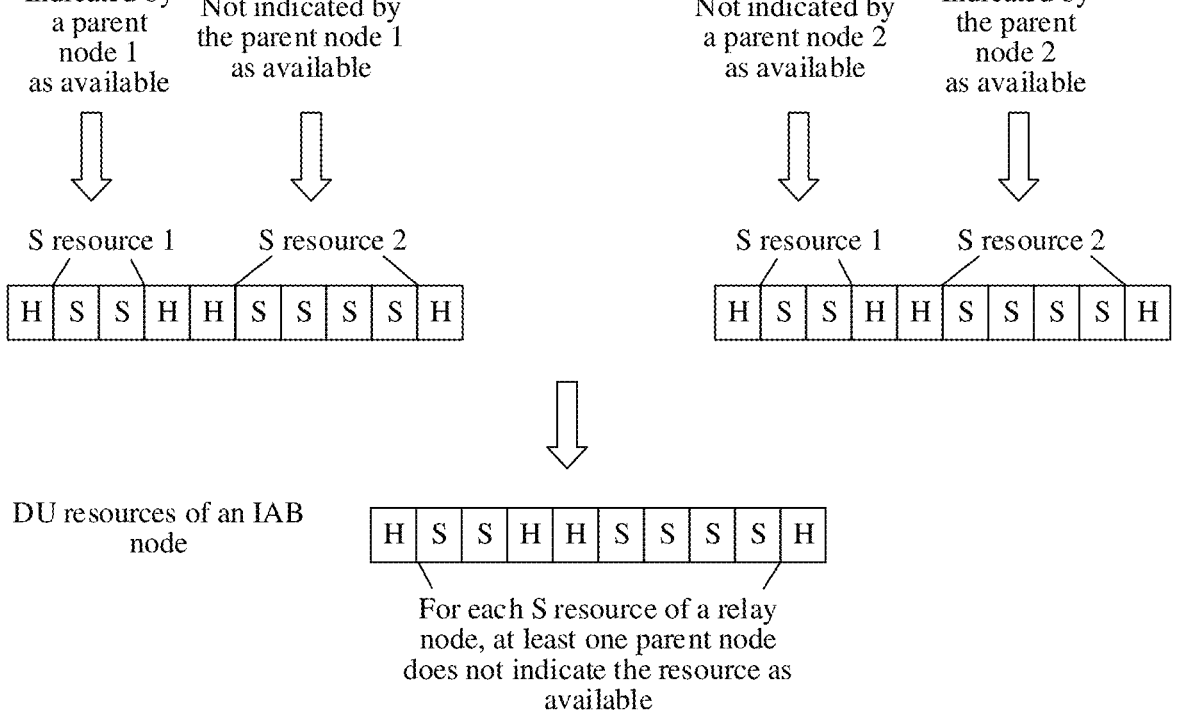
FIG. 6 is a schematic diagram in which two parent nodes of an IAB node indicate available resources to the IAB node according to an embodiment of this application.

For ease of understanding, refer to FIG. 6. FIG. 6 is a schematic diagram in which two parent nodes of an IAB node indicate available resources for the IAB node. In FIG. 6, schedulable resources from left to right are sequentially one hard resource, two soft resources, two hard resources, four soft resources, and one hard resource. In FIG. 6, "S" indicates the soft resource, and "H" indicates the hard resource. An example in which the parent nodes indicate available soft resources for the IAB node is used. For each soft resource on a DU in the IAB node, at least one parent node does not indicate whether the soft resource is available. The following mainly uses the soft resource as an example. For ease of description, the two soft resources on the left side may be referred to as soft resources 1, and the four soft resources on the right side may be referred to as soft resources 2. As shown in FIG. 6, the parent node 1 may indicate the soft resource 1 as available, but does not indicate whether the soft resource 2 is available. The parent node 2 does not indicate whether the soft resource 1 is available, but indicates the soft resource 2 as available. In other words, for each soft resource of the IAB node, at least one parent node does not indicate the soft resource as available. That is, an available soft resource indicated by the parent node 1 and an available soft resource indicated by the parent node 2 have no intersection or rarely intersect. In this case, there are a small quantity of remaining available soft resources for the DU in the IAB node. This may easily cause data congestion on the IAB node.

Therefore, in embodiments of this application, resources between a plurality of parent nodes may be coordinated. For example, the plurality of parent nodes use overlapping resources to schedule the IAB node in a possible case, so that more remaining resources can be used for the IAB-DU, spectral efficiency of the IAB node is improved as much as possible, and the data congestion on the IAB node is avoided.

For example, an embodiment of this application provides a resource configuration method for an IAB node. In the method, a donor node configures one or more resource sets with different priorities, and notifies a plurality of parent nodes of the IAB node. Each parent node may preferentially select, based on the priorities of the resource sets, a resource with a higher priority to schedule the IAB node for transmission. Because a resource with a lower priority is not preferentially indicated, the resource with the lower priority may be used as a resource that is subsequently available to the IAB node. In other words, more remaining resources are available to a DU in the IAB node, to reduce data congestion as much as possible.

A communication method provided in embodiments of this application may be applied to a communication system having a dual-connected relay node, as shown in FIG. 5. It should be understood that FIG. 5 is merely an example for description, and quantities of terminal devices and relay nodes included in the wireless communication system are not specifically limited. In LTE, the relay node is generally referred to as an RN. In NR, the relay node is generally referred to as an IAB node. In some embodiments, the relay node may also be referred to as a relay device or a relay transmission reception point (rTRP). A parent node of the relay node may be a network device (including a DU of the network device, a CU of the network device, or the like).

It should be understood that, in embodiments of this application, the IAB node is used only for a purpose of description, and does not indicate that the solutions in embodiments of this application are used only in an NR scenario. In embodiments of this application, the IAB node may be any node or device having a relay function. It should be understood that use of the IAB node and use of the relay node in embodiments of this application have a same meaning.

A terminal in embodiments of this application may also be referred to as a terminal device, and is an entity configured to receive or transmit a signal on a user side. The terminal may be a device that provides a user with voice and/or data connectivity, for example, a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communications (M2M/MTC) terminal device, an internet of things (IOT) terminal device, a subscriber unit (subscriber unit), a subscriber station, a mobile station, a remote station, an access point (AP), a remote terminal, an access terminal, a user terminal, a user agent, a user device, or the like. For example, the terminal device may include a mobile phone (also referred to as a "cellular" phone), a computer having a mobile terminal device, or a portable, pocket-sized, handheld, or computer-embedded mobile apparatus, for example, a device such as a personal communication service (PCS) phone, a cordless telephone set, a session initiation protocol (SIP) phone, a wireless local loop (WLL) station, or a personal digital assistant (PDA). The terminal device may further include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on a body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices dedicated to only one type of application function and needing to collaboratively work with other devices such as smartphones, for example, various smart bands, smart helmets, or smart jewelry for monitoring physical signs.

If the various terminals described above are located on a vehicle (for example, placed in the vehicle or installed in the vehicle), the terminals may be considered as vehicle-mounted terminal devices. For example, the vehicle-mounted terminal devices are also referred to as on-board units (OBUs). Certainly, the terminal in embodiments of this application may alternatively be a vehicle. Alternatively, the terminal in embodiments of this application may be an internet of things terminal, for example, a smart household appliance including a smart water meter or a smart electricity meter, or the like: or a drive test device. The drive test device herein may include a smart street lamp, a roadside smart camera, and the like.

With reference to the accompanying drawings, the following describes in detail the resource configuration method provided in embodiments of this application.

Figure 7:
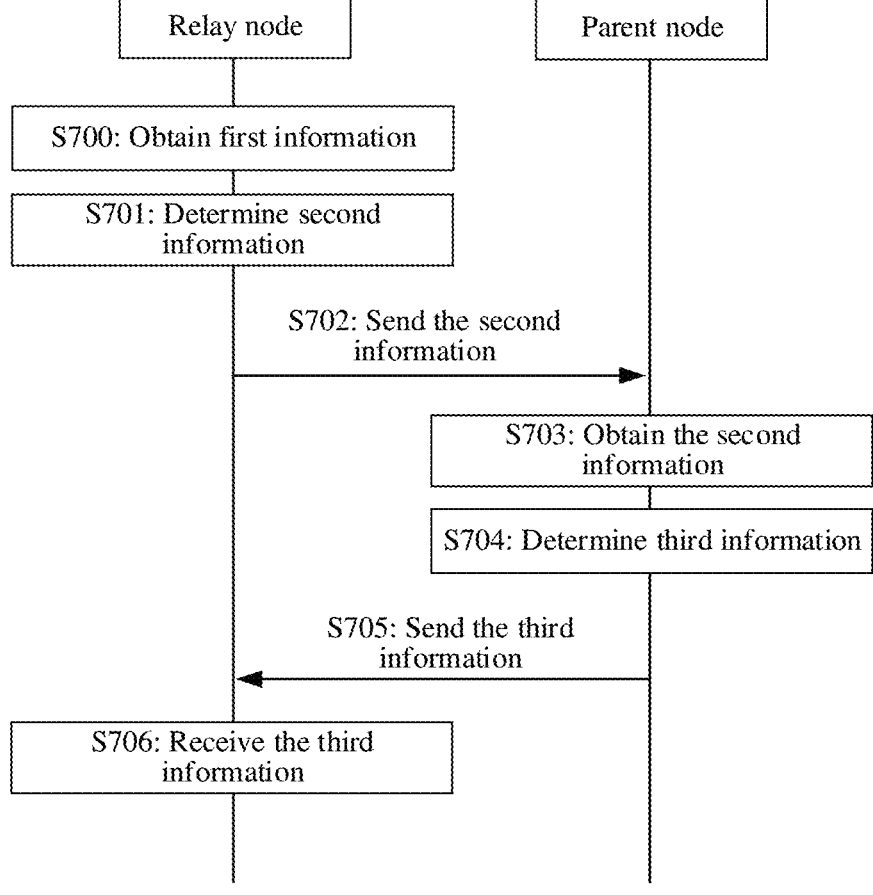
FIG. 7 is a schematic flowchart of a first resource configuration method according to an embodiment of this application.

FIG. 7 is a flowchart of a resource configuration method according to an embodiment of this application.

In the following description process, for example, the method is applied to the communication system shown in FIG. 5. In addition, the method may be performed by three communication apparatuses. The three communication apparatuses are, for example, a first communication apparatus, a second communication apparatus, and a third communication apparatus.

For ease of description, the following uses an example in which the method is performed by an IAB node, a donor node, and a parent node. In other words, an example in which the first communication apparatus is the IAB node, the second communication apparatus is the parent node, and the third communication apparatus is the donor node is used. The parent node may be a base station, or may be another IAB node. The following uses an example in which the parent node is the base station. The base station may be a base station having a donor node function.

It should be noted that, this embodiment of this application merely uses the communication system in FIG. 5 as an example, and is not limited to this scenario. It should be understood that the donor node refers to a donor base station to which the IAB node is currently connected, and the parent node refers to a base station or another IAB node to which the IAB node is currently connected.

Specifically, the following describes a procedure of the resource configuration method provided in this embodiment of this application.

S700: A relay node obtains first information.

In this embodiment of this application, the first information includes an identifier of at least one uplink beam that is used to send a first signal. The first signal includes an SRS. It may be understood that the uplink beam is a beam that is used by an MT in the relay node to communicate with a parent node.

The first signal may further include a CSI-RS and an SSB. It may be understood that in this case, the relay node uses a beam for sending a downlink signal by the relay node, as an identifier of a beam of the first signal. The beam is a beam for sending by a DU in the relay node, but may be measured, recognized, and identified by the parent node. The following uses an example in which the first signal is the SRS and the beam is the uplink beam for description.

In some embodiments, the first information is obtained by the relay node from a donor.

In some embodiments, when the donor configures an SRS resource for the relay node, it is assumed that the donor needs to configure three SRS resources. When the relay node uses an SRS 1 resource configuration to send an SRS signal, a beam that is used is a beam 1. When the relay node uses an SRS 2 resource configuration to send an SRS signal, a beam that is used is a beam 2. When the relay node uses an SRS 3 resource configuration to send an SRS signal, a beam that is used is a beam 3. Therefore, the first information may include a correspondence between the SRS and an identifier of the beam. For example, the first information may include a correspondence in Table 1 below. An identifier of the SRS resource is sometimes referred to as an SRI (SRS resource indicator).

TABLE 1

| Correspondence between an SRS resource and a beam | |
| --- | --- |
| Identifier of an SRS resource | Beam |
| SRS 1 | Beam 1 |
| SRS 2 | Beam 2 |
| SRS 3 | Beam 3 |

The first information in this embodiment of this application may further include an association relationship between the first signal and a configuration case, so that the relay node may determine, based on the association relationship between the first signal and the configuration case, a transmission configuration of the beam that corresponds to the first signal. Alternatively, the first information may include an association relationship between the beam and a configuration case, so that the relay node may determine a transmission configuration of the beam based on the association relationship between the beam and the configuration case.

In some embodiments, the configuration case is determined based on at least one configuration parameter that is set by the donor node.

In some embodiments, the configuration parameter includes one or more of the following information:

Information 1: Setting of a guard band between frequency bands during communication and transmission: The information may indicate whether the guard band is required when the MT and the DU in the relay node perform frequency division multiplexing.

Information 2: Value of a guard band: The information indicates, when frequency division multiplexing is performed on access and backhaul of the relay node, a size of a frequency domain resource reserved between frequency domain resources used by the MT and the DU. The reserved frequency domain resource is not used by the MT or the DU.

For example, the value of the guard band may be indicated by using a quantity of physical resource blocks (PRBs).

Information 3: Quantity of guard symbols: The information indicates time required for switching between working of the MT and the DU in the relay node.

Information 4: Undesired beam set: The information indicates that the relay node performs space division multiplexing on the MT and the DU.

Information 5: Quantity of TRxs of a carrier: The information indicates a quantity of ports that can be used for access or backhaul communication when the relay node performs space division multiplexing or frequency division multiplexing.

Information 6: Setting of a downlink received power interval of the mobile terminal MT in the relay node: The information indicates a desired range or a desired adjustment amount of downlink transmit power of the MT when the relay node performs space division receiving. For example, current power for downlink signal transmission of the parent node is reduced by X dB.

Information 7: Maximum quantity of demodulation reference signal DMRS ports for downlink scheduling of the MT in the relay node.

Information 8: Maximum quantity of DMRS ports for uplink scheduling of the MT in the relay node.

For example, the donor base station or the parent node of the relay node may configure a plurality of groups of configuration parameters by using signaling, and each group of configuration parameters includes one or more of the foregoing information. Each group of parameters may be identified by an ID. The following shows a structure:

```
Multiplexing parameter configuration:
{
Parameter set ID
Frequency division multiplexing: Select {Yes, No} (optional)
Guard band value: Select {2, 4, 8, 16, 32, 64} (optional)
Desired beam: TCI state ID #Y (optional)
...
}
```

The foregoing parameters may alternatively be reported by the relay node to the parent node or the donor node. In other words, after a parameter desired by the relay node is reported, the parent node or the donor node configures the parameter for the relay node.

The parent node of the relay node may further indicate a parameter set ID by using DCI signaling or MAC-CE signaling. The parameter set ID indicates an effective parameter set of the relay node. After the indicated parameter set takes effect, the relay node performs space division transmission on a preconfigured space division transmission time resource based on a parameter indicated by the parameter set.

It should be noted that names of the foregoing information elements are merely an example, and may be replaced with other names for implementing an equivalent function during implementation. This is not limited in this application.

S701: The relay node determines second information based on the first information.

In this embodiment of this application, the second information includes a correspondence between the uplink beam and desired PSD.

In this embodiment of this application, the PSD refers to a PSD range of an uplink transmission signal, which is referred to as PSD for short.

In this embodiment of this application, the second information includes content in various forms, and specifically includes but is not limited to the following:

Content 1: In this embodiment of this application, the uplink beam included in the second information corresponds to one PSD value.

It should be noted that, in this embodiment of this application, the correspondence between the uplink beam and the PSD may be specifically associated based on an actual situation.

For example, it is assumed that uplink beams indicated in the first information received by the relay node include uplink beams 1 to 4. The relay node determines corresponding desired PSD for each uplink beam.

Figure 8:
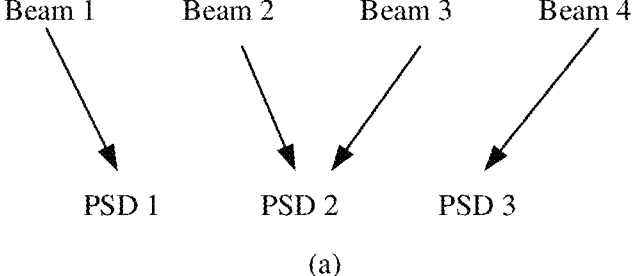
FIG. 8 is a schematic diagram of a first association relationship between beams and PSD according to an embodiment of this application.
Figure 8:
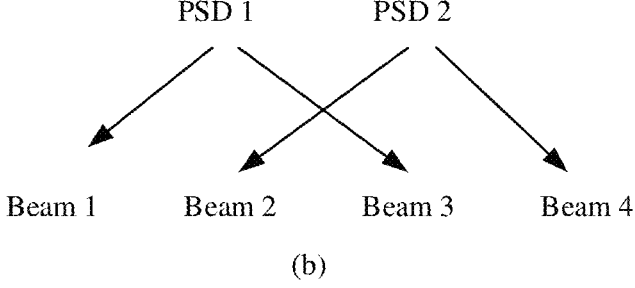

As shown in (a) in FIG. 8, for example, desired PSD determined by the relay node for the uplink beam 1 is PSD 1. Desired PSD determined by the relay node for the uplink beam 2 is PSD 2. Desired PSD determined by the relay node for the uplink beam 3 is the PSD 2. Desired PSD determined by the relay node for the uplink beam 4 is PSD 3. Therefore, the content of the second information sent by the relay node to the parent node may be the content shown in (a) in FIG. 8.

For another example, as shown in (b) in FIG. 8, desired PSD determined by the relay node for the uplink beam 1 is PSD 1. Desired PSD determined by the relay node for the uplink beam 2 is PSD 2. Desired PSD determined by the relay node for the uplink beam 3 is the PSD 1. Desired PSD determined by the relay node for the uplink beam 4 is the PSD 2. Therefore, the content of the second information sent by the relay node to the parent node may be the content shown (b) in FIG. 8.

Based on the content described in FIG. 8, it may be understood that the correspondence in the second information in this embodiment of this application may be a beam and information about PSD associated with the beam, or may be PSD and information about a beam associated with the PSD. The correspondence is represented in various forms, and this is not limited herein.

Content 2: In this embodiment of this application, one or more uplink beams included in the second information may correspond to a plurality of PSD values.

It should be noted that, in this embodiment of this application, the correspondence between the uplink beam and the PSD may be specifically associated based on an actual situation.

In some embodiments, corresponding desired PSD may be set based on different configuration cases of a beam, so that the parent node may set transmit power of the beam based on the different configuration cases of the beam.

For example, Table 2 below shows an example of a corresponding case. The parameter configuration includes but is not limited to a state indicating whether frequency division multiplexing is performed and the value of the guard band in the example. A representation form of a desired PSD range includes but is not limited to the case in the example. The representation form may further include only a lower limit, or both an upper limit and a lower limit. The PSD range may further be represented as nominal power P0 and/or an offset value for uplink sending.

TABLE 2

| Example of a beam configuration case | | |
| --- | --- | --- |
| Beam identifier | Desired PSD range | Parameter configuration |
| Beam 1 | An upper limit of uplink PSD is 23 dBm. | . . . Frequency division Guard band = Four PRBs . . . |
| Beam 1 | An upper limit of uplink PSD is 15 dBm. | . . . No frequency division . . . |

For example, it is assumed that uplink beams indicated in the first information received by the relay node include uplink beams 1 and 2. The relay node determines corresponding desired PSD for each uplink beam based on configuration cases 1 to 3.

Figure 9:
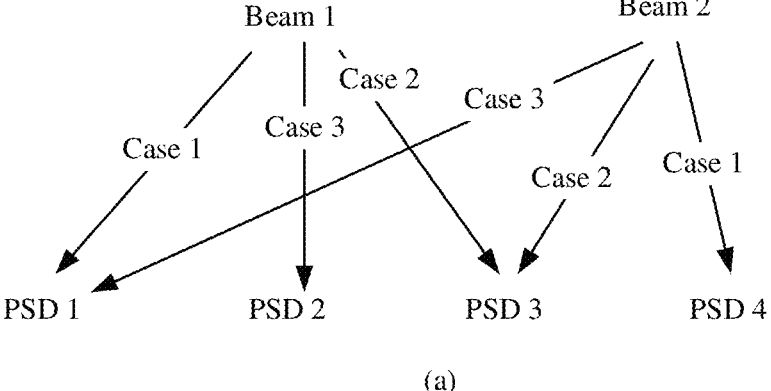
FIG. 9 is a schematic diagram of a second association relationship between beams and PSD according to an embodiment of this application.
Figure 9:
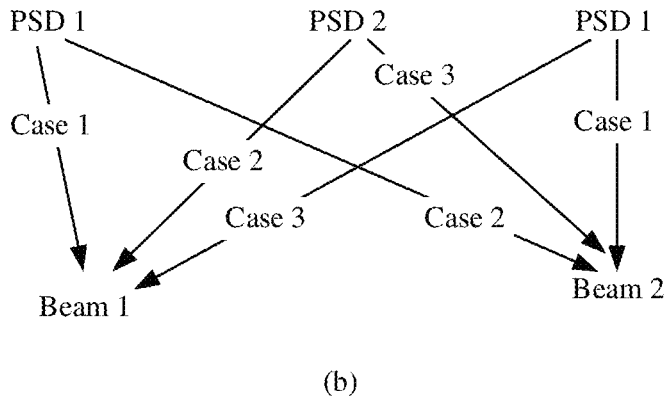

As shown in (a) in FIG. 9, for example, when a configuration case of the uplink beam 1 is the configuration case 1, desired PSD determined by the relay node for the uplink beam 1 is PSD 1. When a configuration case of the uplink beam 1 is the configuration case 2, desired PSD determined by the relay node for the uplink beam 1 is PSD 3. When a configuration case of the uplink beam 1 is the configuration case 3, desired PSD determined by the relay node for the uplink beam 1 is PSD 2.

When a configuration case of the uplink beam 2 is the configuration case 1, desired PSD determined by the relay node for the uplink beam 2 is PSD 4. When a configuration case of the uplink beam 2 is the configuration case 2, desired PSD determined by the relay node for the uplink beam 2 is the PSD 3. When a configuration case of the uplink beam 2 is the configuration case 3, desired PSD determined by the relay node for the uplink beam 2 is the PSD 1. Therefore, the content of the second information sent by the relay node to the parent node may be the content shown in (a) in FIG. 9.

For another example, as shown in (b) in FIG. 9, desired PSD determined by the relay node for the uplink beam 1 in the configuration case 1 is PSD 1. Desired PSD determined by the relay node for the uplink beam 1 in the configuration case 2 is PSD 2. Desired PSD determined by the relay node for the uplink beam 1 in the configuration case 3 is PSD 3.

Desired PSD determined by the relay node for the uplink beam 2 in the configuration case 1 is the PSD 3. Desired PSD determined by the relay node for the uplink beam 2 in the configuration case 2 is the PSD 1. Desired PSD determined by the relay node for the uplink beam 2 in the configuration case 3 is the PSD 2. Therefore, the content of the second information sent by the relay node to the parent node may alternatively be the content shown (b) in FIG. 9.

Based on the content described in FIG. 9, it may be understood that the correspondence in the second information in this embodiment of this application may be a beam, a configuration case, and information about PSD associated with the beam, or may be PSD, a configuration case, and information about a beam associated with the PSD. The correspondence is represented in various forms, and this is not limited herein.

Content 3: In this embodiment of this application, the parameter set that is included in the second information and that is used to configure the uplink beam may correspond to one or more PSD values.

The content 3 may be understood as that a configuration parameter may alternatively be directly combined with a beam. For example, the donor base station or the parent node of the relay node may configure a plurality of parameter sets for a beam by using signaling, and each parameter set includes one or more of the information 1 to 8 that indicate configuration parameters. Each parameter set may be identified by an ID.

For example, the following shows a structure of the parameter set:

```
Multiplexing parameter configuration:
{
Parameter set ID
Frequency division multiplexing: Select {Yes, No} (optional)
Guard band value: Select {2, 4, 8, 16, 32, 64} (optional)
...
}
or
    MultiplexingParameters information element
ASN1START
TAG- MultiplexingParameters-Mode-START
MultiplexingParametersSet::=               SEQUENCE {
MultiplexingParametersSet -Id                  MultiplexingParametersSet -Id,
FDM                                            ENUMERATED {on, off}
```

-continued

| | |
|---|---|
| Guardband | ENUMERATED {2,4,6,8,16,32,64} |
| DLpowercontrol | INTEGER {−8, 15} |
| ULpowercontrol | INTEGER {−20, 23} |
| TCI stateId | TCI stateId, |
| srs-ResourceSetId | SRS-ResourceSetId |
| MaxMIMO-LayersDL-r16 ::= | INTEGER (1..8) |
| Timingmode | ENUMERATED {Case6, Case7} |
| } | |
| TAG- MultiplexingParameters-STOP | |
| ASN1STOP | |

In some embodiments, corresponding desired PSD ranges may be set based on different parameter sets, so that the parent node may set transmit power of the beam based on different configuration cases of the beam.

For example, it is assumed that a correspondence between the parameter set and the desired PSD range is shown in Table 3 below.

TABLE 3

Correspondence between a parameter set and a PSD range

| Parameter set identifier | Desired PSD range |
|---|---|
| Parameter set 1 | An upper limit of uplink PSD is 23 dBm. |
| Parameter set 2 | An upper limit of uplink PSD is 15 dBm. |
| Parameter set 3 | An upper limit of uplink PSD is 21 dBm. |

It is assumed that when the beam 1 may be configured by using the parameter set 1 to the parameter set 3, the second information sent by the relay node to the parent node indicates the correspondence between the parameter set and the desired PSD, that is, the content in Table 3 above. Therefore, when the parent node determines that the beam 1 is configured by using the parameter set 2, it can be learned from the content in Table 3 that the upper limit of the corresponding uplink PSD is 15 dBm. Therefore, corresponding transmit power of the beam 1 that is configured by using the parameter set 2 may be determined based on the PSD (where the upper limit of the uplink PSD is 15 dBm).

It should be noted that, in this embodiment of this application, the correspondence between the parameter set and the PSD range may be specifically associated based on an actual situation.

The parameter set configured in this embodiment of this application may not include the beam identifier, or may not include the uplink power PSD range, or may not include the beam identifier or the uplink power PSD range.

Further, the parent node of the relay node in this embodiment of this application may further indicate an association relationship between a parameter set and a beam identifier and/or a power PSD range by using the DCI signaling or MAC-CE signaling. For example, the parent node sends the MAC-CE signaling, as shown in Table 4 below.

| Parameter set ID | Beam ID |
|---|---|
| Uplink power PSD range | |

In some embodiments, one row in Table 4 above may have a length of an 8-bit sequence in the MAC-CE signaling. Herein, only content included in the MAC-CE is used as an example. Based on Table 4, it should be understood that the content included in the MAC-CE may not be limited herein.

In addition, in the foregoing method, the beam identifier or the uplink power PSD range may not be dynamically indicated, but another parameter in a parameter set that is not preconfigured is dynamically indicated. In this case, the beam identifier or the PSD range may be preconfigured as a part of the configuration parameters. Specific parameters (or a parameter combination) are determined based on a dynamic indication of the parent node, and details are not described herein.

S702: The relay node sends the second information to the parent node.

S703: The parent node obtains the second information.

S704: The parent node determines third information based on the second information, where the third information indicates the relay node to determine transmit power based on information sent by using the beam.

In some embodiments, the sent information may include data of a control channel, data of a data channel, and an SRS. For example, data or an SRS is transmitted by using the beam based on the transmit power that is indicated by the third information and that corresponds to the beam.

S705: The parent node sends the third information to the relay node.

S706: The relay node receives the third information.

According to the method, the parent node can configure the transmit power of the beam more flexibly and accurately, thereby effectively reducing communication interference.

Further, in this embodiment of this application, to reduce unnecessary impact on downlink beam communication and transmission, the parent node in this embodiment of this application may further indicate a restriction relationship between the uplink beam and a downlink beam to the relay node. Therefore, when the parent node uses the uplink beam for transmission, only a corresponding downlink transmission beam needs to be restricted, and all downlink beams do not need to be restricted, thereby effectively reducing the impact on the downlink beam communication and transmission.

Figure 10:
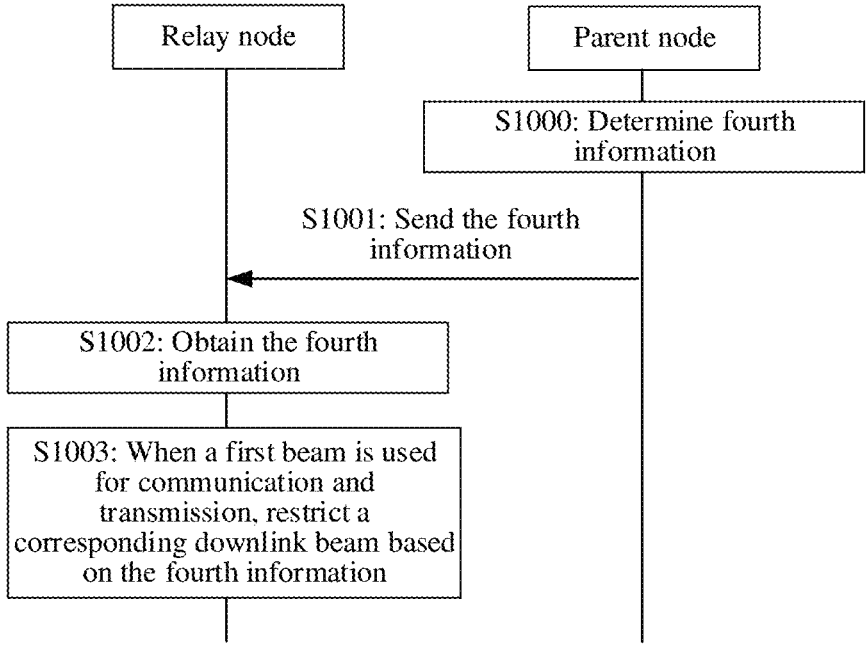
FIG. 10 is a schematic flowchart of a second resource configuration method according to an embodiment of this application.

Specifically, as shown in FIG. 10, the following describes a procedure of another resource configuration method provided in an embodiment of this application.

S1000: A parent node determines fourth information, where the fourth information includes a restriction relationship between an uplink beam and a downlink beam.

In some embodiments, the parent node may determine the fourth information after the parent node receives the second information sent by the relay node in the foregoing embodiment.

In some embodiments, the fourth information may be determined by the parent node based on the received second information.

S1001: The parent node sends the fourth information to a relay node.

In some embodiments, the fourth information may be carried in the third information in the foregoing embodiment, or may be sent separately. A sending manner and a sending occasion are not limited in this embodiment of this application.

S1002: The relay node receives the fourth information.

S1003: When using a first beam for communication and transmission, the relay node restricts, based on the fourth information, use of a downlink beam that corresponds to the first beam.

For example, it is assumed that the restriction relationship between the uplink beam and the downlink beam included in the fourth information is shown in Table 5 below.

TABLE 5

| Restriction relationship between an uplink beam and a downlink beam | |
|---|---|
| Identifier of an uplink beam | Identifier of a downlink beam |
| Uplink beam 1 | Downlink beams 1, 5, and 4 |
| Uplink beam 2 | Downlink beams 2 and 3 |
| Uplink beam 3 | Downlink beams 4 and 6 |

It is assumed that when the relay node uses the uplink beam 1 for communication and transmission, the downlink beams include downlink beams 1 to 10. The relay node may select the downlink beams 1, 5, and 4 from the downlink beams 1 to 10 based on the content in Table 5 above for restriction.

In addition, in this embodiment of this application, a plurality of manners may be used to determine a downlink beam that needs to be restricted. The manners are not limited to the content shown in Table 4 above. Any content such as a mapping relationship that can be applied to this embodiment of this application may be used to determine the downlink beam that needs to be restricted. For example, in this embodiment of this application, the downlink beam that needs to be restricted may alternatively be determined based on a correspondence between a parameter configuration set and the downlink beam that needs to be restricted.

It is assumed that a restriction relationship between a parameter configuration set and a downlink beam included in the fourth information is shown in Table 6 below.

TABLE 6

| Restriction relationship between a parameter set identifier and a downlink beam | |
|---|---|
| Parameter set identifier | Identifier of a restricted downlink beam |
| Parameter set 1 | Downlink beams 1, 5, and 4 |
| Parameter set 2 | Downlink beams 2 and 3 |
| Parameter set 3 | Downlink beams 4 and 6 |

Therefore, when the relay node determines that an applied uplink beam is configured by using the parameter set 1, the relay node determines to restrict the downlink beams 1, 5, and 4 based on the content in Table 5 above.

Further, in this embodiment of this application, when determining that a first condition is satisfied, the relay node may further lift a restriction on the downlink beam, to avoid impact, caused by the restriction on the downlink beam, on a service with a high priority that applies the downlink beam for transmission.

Figure 11:
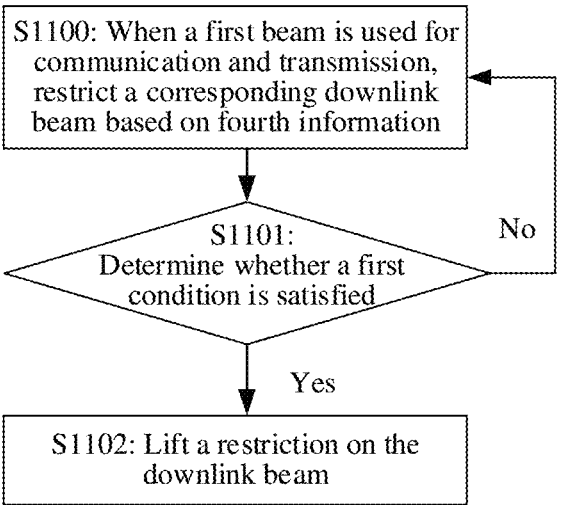
FIG. 11 is a schematic flowchart of a third resource configuration method according to an embodiment of this application.

Specifically, as shown in FIG. 11, the following describes a procedure of another resource configuration method provided in an embodiment of this application.

S1100: When using a first beam for communication and transmission, a relay node restricts, based on fourth information, use of a downlink beam that corresponds to a first beam.

S1101: The relay node determines whether a first condition is satisfied. If the first condition is satisfied, S1102 is performed. If the first condition is not satisfied, S1100 is performed.

In this embodiment of this application, the first condition may be obtained by the relay node from a donor node, or the first condition is obtained by the relay node from a parent node, or the first condition is predefined in a protocol.

In some embodiments, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted.

Alternatively, if the first condition includes that a second signal exists in a slot, a resource type of the slot is considered as a hard resource. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS. When a resource of a DU is configured as a hard resource, sending and/or receiving on the resource in any cell of an IAB-DU may not be restricted. The restriction includes the restriction on the downlink beam.

The second signal includes one or more of the SS/PBCH block, the PDCCH common search space set, and the periodic CSI-RS.

S1102: The relay node lifts the restriction on the downlink beam.

In some embodiments, when determining that one of first cells satisfies the first condition, the relay node may lift a restriction on a downlink beam that corresponds to a cell that satisfies a second condition. Alternatively, when determining that one of first cells satisfies the first condition, the relay node lifts a restriction on downlink beams that correspond to all the first cells. The downlink beams that correspond to all the cells in the first cell are the same.

In embodiments of this application, the method provided in embodiments of this application is described from perspectives of the IAB node, the donor node, the parent node, and interaction between the IAB node, the donor node, and the parent node. To implement functions in the method provided in the foregoing embodiments of this application, the IAB node, the donor node, and the parent node may include a hardware structure and/or a software module, and implement the foregoing functions in a form of the hardware structure, the software module, or a combination of the hardware structure and the software module.

The following describes, with reference to the accompanying drawings, communication apparatuses configured to implement the foregoing method in embodiments of this application. Therefore, all the foregoing content may be used in the following embodiments. Repeated content is not described in detail again.

Figure 12:
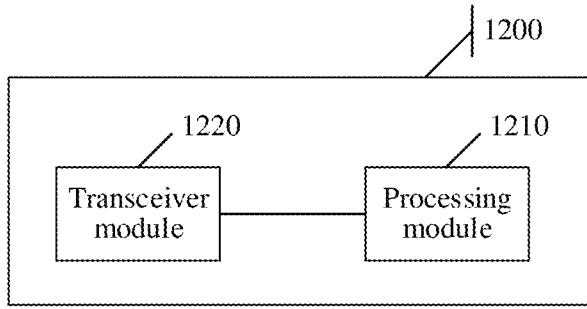
FIG. 12 is a schematic diagram of a first structure of a communication apparatus according to an embodiment of this application.

FIG. 12 is a schematic block diagram of a communication apparatus 1200 according to an embodiment of this application. The communication apparatus 1200 may correspondingly implement functions or steps implemented by the relay node or the parent node in the foregoing method embodiments. The communication apparatus may include a processing module 1210 and a transceiver module 1220. In some embodiments, a storage unit may be further included. The storage unit may be configured to store instructions (code or a program) and/or data. The processing module 1210 and the transceiver module 1220 may be coupled to the storage unit. For example, the processing module 1210 may read the instructions (the code or the program) and/or the data in the storage unit, to implement a corresponding method. The foregoing units may be independently disposed, or may be partially or completely integrated.

In some possible implementations, the communication apparatus 1200 can correspondingly implement behavior and functions of the relay node in the foregoing method embodiments. For example, the communication apparatus 1200 may be the relay node, or may be a component (for example, a chip or a circuit) used in the relay node. The transceiver module 1220 may be configured to perform all receiving or sending operations performed by the relay node in the embodiment shown in FIG. 7, for example, S701, S702 and S704 in the embodiment shown in FIG. 7, and/or configured to support another process of the technology described in this specification. The transceiver module 1220 may include a sending module and a receiving module that are independent of each other. The sending module is configured to perform all the sending operations performed by the relay node in the embodiment shown in FIG. 7. The receiving module is configured to perform all the receiving operations performed by the relay node in the embodiment shown in FIG. 7. The processing module 1210 is configured to perform all operations, except the receiving and sending operations, performed by the relay node in the embodiment shown in FIG. 7, and/or configured to support another process of the technology described in this specification.

In some embodiments, the transceiver module 1220 is configured to obtain first information, where the first information includes an identifier of at least one beam that is used to send a first signal. The processing module 1210 is configured to send second information to the parent node based on the first information, where the second information includes a correspondence between the beam and desired power spectrum density PSD. The transceiver module 1220 is configured to receive third information sent by the parent node, where the third information indicates the relay node to determine transmit power based on information sent by using the beam.

In an optional implementation, the beam is a beam used by an MT in the relay node to communicate with the parent node.

In an optional implementation, the correspondence between the beam and the desired PSD includes the beam and PSD information associated with the beam, or the PSD and beam information associated with the PSD.

In an optional implementation, the first signal includes an uplink sounding reference signal SRS.

In an optional implementation, each beam in the beam corresponds to one or more desired PSD ranges, or each PSD range corresponds to one or more beams.

In an optional implementation, the first information further includes an association relationship between a first case and the first signal that corresponds to the beam; and the first case is determined based on at least one parameter.

In an optional implementation, the second information further includes an association relationship between the first case and the PSD that corresponds to the beam; and the first case is determined based on at least one parameter.

In an optional implementation, the parameter includes at least one of the following:

a setting of a guard band between frequency bands during communication and transmission, a value of the guard band, a quantity of guard symbols, an undesired beam set, a quantity of TRxs of a carrier, a setting of a downlink received power interval of the mobile terminal MT in the relay node, a maximum quantity of demodulation reference signal DMRS ports for downlink scheduling of the MT, or a maximum quantity of DMRS ports for uplink scheduling of the MT.

In an optional implementation, the transceiver module 1220 is further configured to:

receive fourth information sent by the parent node, where the fourth information includes a restriction relationship between an uplink beam and a downlink beam.

The processing module 1210 is further configured to:

when the beam is used for the communication and transmission, restrict, based on the fourth information, use of a downlink beam that corresponds to the beam.

In an optional implementation, the downlink beam is a beam used by a DU in the relay node to communicate with a corresponding terminal.

In an optional implementation, the transceiver module 1220 is further configured to:

obtain a first condition, where the first condition indicates to lift a restriction on the downlink beam.

The processing module 1210 is further configured to:

lift the restriction on the downlink beam when it is determined that the first condition is satisfied.

In an optional implementation, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In an optional implementation, the processing module 1210 may be specifically configured to:

when it is determined that one of first cells satisfies the first condition, lift a restriction on a downlink beam that corresponds to a cell that satisfies a second condition: or when it is determined that one of first cells satisfies the first condition, lift a restriction on downlink beams that correspond to all the first cells, where the downlink beams that correspond to all the first cells are the same.

In some other embodiments, the transceiver module 1220 is configured to receive the fourth information sent by the parent node, where the fourth information includes the restriction relationship between the uplink beam and the downlink beam. The processing module 1210 is configured to: when a first beam is used for communication and transmission, restrict, based on the fourth information, use of the downlink beam that corresponds to the first beam.

In an optional implementation, the first beam is a beam used by the MT in the relay node to communicate with the parent node.

In an optional implementation, the downlink beam is a beam used by the DU in the relay node to communicate with the corresponding terminal.

In an optional implementation, the transceiver module 1220 is further configured to:

obtain the first condition, where the first condition indicates to lift a restriction on the downlink beam, and lift the restriction on the downlink beam when the relay node determines that the first condition is satisfied.

In an optional implementation, the first condition is obtained by the relay node from a donor node. Alternatively, the first condition is obtained by the relay node from the parent node.

In an optional implementation, if the first condition includes that the second signal exists in the slot, the restriction on all the downlink beams that correspond to the beam is lifted. Alternatively, if the first condition includes that the second signal exists in the first symbol in the slot, the restriction on the downlink beam that corresponds to the beam in the first symbol is lifted. The second signal includes one or more of the SS/PBCH block, the PDCCH common search space set, and the periodic CSI-RS.

In an optional implementation, the processing module 1210 may be specifically configured to: when it is determined that one of first cells satisfies the first condition, lift a restriction on a downlink beam that corresponds to a cell that satisfies a second condition: or when it is determined that one of first cells satisfies the first condition, lift a restriction on downlink beams that correspond to all the first cells, where the downlink beams that correspond to all the first cells are the same.

In an optional implementation, the transceiver module 1220 may be further configured to obtain first information, where the first information includes an identifier of at least one beam that is used to send a first signal. The processing module 1210 may be further configured to send second information to the parent node based on the first information, where the second information includes a correspondence between the beam and desired power spectrum density PSD. The transceiver module 1220 may be further configured to receive the third information sent by the parent node, where the third information indicates the relay node to determine transmit power based on information sent by using the beam.

In an optional implementation, the first information is obtained by the relay node from a donor node.

In an optional implementation, the correspondence between the beam and the desired PSD includes the beam and PSD information associated with the beam, or the PSD and beam information associated with the PSD.

In an optional implementation, the first signal includes an uplink sounding reference signal SRS.

In an optional implementation, each beam in the beam corresponds to one or more desired PSD ranges.

In an optional implementation, each PSD range corresponds to one or more beams.

In an optional implementation, the first information further includes an association relationship between a first case and the first signal that corresponds to the beam: and the first case is determined based on at least one parameter.

In an optional implementation, the second information further includes an association relationship between a first case and the PSD that corresponds to the beam: and the first case is determined based on at least one parameter.

In an optional implementation, the parameter includes at least one of the following:

a setting of a guard band between frequency bands during communication and transmission, a value of the guard band, a quantity of guard symbols, an undesired beam set, a quantity of TRxs of a carrier, a setting of a downlink received power interval of a mobile terminal MT in the relay node, a maximum quantity of demodulation reference signal DMRS ports for downlink scheduling of the MT, or a maximum quantity of DMRS ports for uplink scheduling of the MT.

In some other possible implementations, the communication apparatus 1200 can correspondingly implement behavior and functions of the parent node in the foregoing method embodiments. For example, the communication apparatus 1200 may be the parent node, or may be a component (for example, a chip or a circuit) used in the parent node. The transceiver module 1220 may be configured to perform all receiving or sending operations performed by the parent node in the embodiment shown in FIG. 7, for example, S704 in the embodiment shown in FIG. 7, and/or configured to support another process of the technology described in this specification. The transceiver module 1220 may include a sending module and a receiving module that are independent of each other. The sending module is configured to perform all the sending operations performed by the parent node in the embodiment shown in FIG. 7. The receiving module is configured to perform all the receiving operations performed by the parent node in the embodiment shown in FIG. 7. The processing module 1210 is configured to perform all operations, except the receiving and sending operations, performed by the parent node in the embodiment shown in FIG. 7, and/or configured to support another process of the technology described in this specification.

In some embodiments, the transceiver module 1220 is configured to send first information to a relay node, where the first information includes an identifier of at least one beam that is used to send a first signal: and receive second information from the relay node, where the second information includes a correspondence between the identifier of the beam and desired power spectrum density PSD. The processing module 1210 is configured to send third information to the relay node based on the second information, where the third information indicates the relay node to determine transmit power based on information sent by using the beam.

In an optional implementation, the beam is a beam used by an MT in the relay node to communicate with a parent node.

In an optional implementation, the correspondence between the beam and the desired PSD includes the beam and PSD information associated with the beam, or the PSD and beam information associated with the PSD.

In an optional implementation, the first signal includes an uplink sounding reference signal SRS.

In an optional implementation, each beam in the beam corresponds to one or more desired PSD ranges, or each PSD range corresponds to one or more beams.

In an optional implementation, the first information further includes an association relationship between a first case and the first signal that corresponds to the beam: and the first case is determined based on at least one parameter.

In an optional implementation, the second information further includes an association relationship between the first case and the PSD that corresponds to the beam: and the first case is determined based on at least one parameter.

In an optional implementation, the parameter includes at least one of the following: a setting of a guard band between frequency bands during communication and transmission, a value of the guard band, a quantity of guard symbols, an undesired beam set, a quantity of TRxs of a carrier, a setting of a downlink received power interval of the mobile terminal MT in the relay node, a maximum quantity of demodulation reference signal DMRS ports for downlink scheduling of the MT, or a maximum quantity of DMRS ports for uplink scheduling of the MT.

In an optional implementation, the transceiver module 1220 is further configured to send fourth information to the relay node, where the fourth information includes a restriction relationship between an uplink beam and a downlink beam.

In an optional implementation, if the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In some other embodiments, the transceiver module 1220 is configured to send fourth information to the relay node, where the fourth information includes a restriction relationship between an uplink beam and a downlink beam.

In an optional implementation, the processing module 1210 may be further configured to determine a first condition, and notify the relay node of the first condition by using the transceiver module 1220. If the first condition includes that a second signal exists in a slot, a restriction on all downlink beams that correspond to the beam is lifted. Alternatively, if the first condition includes that a second signal exists in a first symbol in a slot, a restriction on a downlink beam that corresponds to the beam in the first symbol is lifted. The second signal includes one or more of an SS/PBCH block, a PDCCH common search space set, and a periodic CSI-RS.

In an optional implementation, the transceiver module 1220 may further send first information to the relay node, where the first information includes an identifier of at least one beam that is used to send a first signal: and receive second information from the relay node, where the second information includes a correspondence between the identifier of the beam and desired power spectrum density PSD. The processing module 1210 is further configured to send third information to the relay node based on the second information, where the third information indicates the relay node to determine transmit power based on information sent by using the beam.

In an optional implementation, the fourth information may be determined by the parent node based on the second information.

In an optional implementation, the beam is a beam used by an MT in the relay node to communicate with the parent node.

In an optional implementation, the correspondence between the beam and the desired PSD includes the beam and PSD information associated with the beam, or the PSD and beam information associated with the PSD.

In an optional implementation, the first signal includes an uplink sounding reference signal SRS.

In an optional implementation, each beam in the beam corresponds to one or more desired PSD ranges, or each PSD range corresponds to one or more beams.

In an optional implementation, the first information further includes an association relationship between a first case and the first signal that corresponds to the beam; and the first case is determined based on at least one parameter.

In an optional implementation, the second information further includes an association relationship between the first case and the PSD that corresponds to the beam: and the first case is determined based on at least one parameter.

In an optional implementation, the parameter includes at least one of the following: a setting of a guard band between frequency bands during communication and transmission, a value of the guard band, a quantity of guard symbols, an undesired beam set, a quantity of TRxs of a carrier, a setting of a downlink received power interval of the mobile terminal MT in the relay node, a maximum quantity of demodulation reference signal DMRS ports for downlink scheduling of the MT, or a maximum quantity of DMRS ports for uplink scheduling of the MT.

Figure 13:
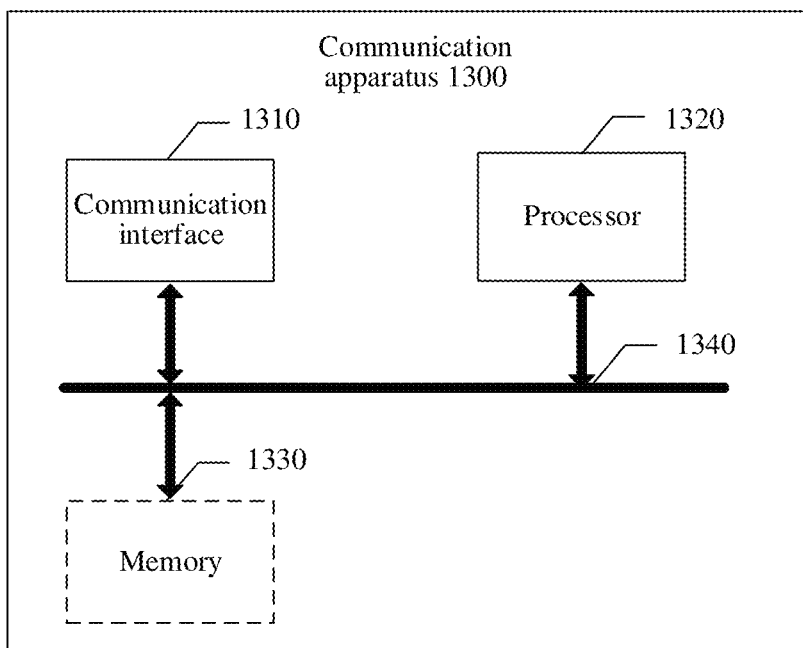
FIG. 13 is a schematic diagram of a second structure of a communication apparatus according to an embodiment of this application.

FIG. 13 shows a communication apparatus 1300 according to an embodiment of this application. The communication apparatus 1300 may be a relay node, and can implement a function of the relay node in the method provided in embodiments of this application. Alternatively, the communication apparatus 1300 may be a parent node, and can implement a function of the parent node in the method provided in embodiments of this application. Alternatively, the communication apparatus 1300 may be an apparatus that can support a relay node in implementing a corresponding function in the method provided in embodiments of this application, or may be an apparatus that can support a parent node in implementing a corresponding function in the method provided in embodiments of this application. The communication apparatus 1300 may be a chip system or the parent node. In this embodiment of this application, the chip system may include a chip, or may include a chip and another discrete component.

In hardware implementation, the transceiver module 1220 may be a transceiver, and the transceiver is integrated into the communication apparatus 1300 to form a communication interface 1310.

The communication apparatus 1300 includes at least one processor 1320, configured to implement or support the communication apparatus 1300 in implementing the function of the parent node or a function of a donor node in the method provided in embodiments of this application. For details, refer to the detailed descriptions in the method examples. Details are not described herein again.

The communication apparatus 1300 may further include at least one memory 1330, configured to store program instructions and/or data. The memory 1330 is coupled to the processor 1320. The coupling in embodiments of this application may be an indirect coupling or a communication connection between apparatuses, units, or modules in an electrical form, a mechanical form, or another form, and is used for information exchange between the apparatuses, the units, or the modules. The processor 1320 may cooperate with the memory 1330. The processor 1320 may execute the program instructions and/or the data stored in the memory 1330, to enable the communication apparatus 1300 to implement a corresponding method. At least one of the at least one memory may be included in the processor.

The communication apparatus 1300 may further include the communication interface 1310, configured to communicate with another device through a transmission medium, to enable an apparatus used in the communication apparatus 1300 to communicate with the another device. For example, when the communication apparatus is the relay node, the another device is the parent node. Alternatively, when the communication apparatus is the parent node, the another device is the relay node. The processor 1320 may send and receive data through the communication interface 1310. The communication interface 1310 may be specifically a transceiver.

A specific connection medium between the communication interface 1310, the processor 1320, and the memory 1330 is not limited in this embodiment of this application. In this embodiment of this application, in FIG. 13, the memory 1330, the processor 1320, and the communication interface 1310 are connected through the bus 1340. The bus is represented by using a thick line in FIG. 13. A manner in which other components are connected is merely used as an example for description, and is not limited thereto. The bus may be classified into an address bus, a data bus, a control bus, and the like. For ease of description, the bus in FIG. 13 is represented by using only the thick line. This does not indicate that there is only one bus or one type of bus.

In this embodiment of this application, the processor 1320 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any processor or the like. The steps of the method disclosed with reference to embodiments of this application may be directly performed by a hardware processor, or may be performed by using a combination of hardware in the processor and a software module.

In embodiments of this application, the memory 1330 may be a non-volatile memory, for example, a hard disk drive (HDD) or a solid-state drive (SSD), or may be a volatile memory, for example, a random access memory (RAM). The memory is any other medium that can carry or store expected program code in a form of instructions or a data structure and that can be accessed by a computer, but is not limited thereto. The memory in embodiments of this application may alternatively be a circuit or any other apparatus that can implement a storage function, and is configured to store the program instructions and/or the data.

Figure 14:
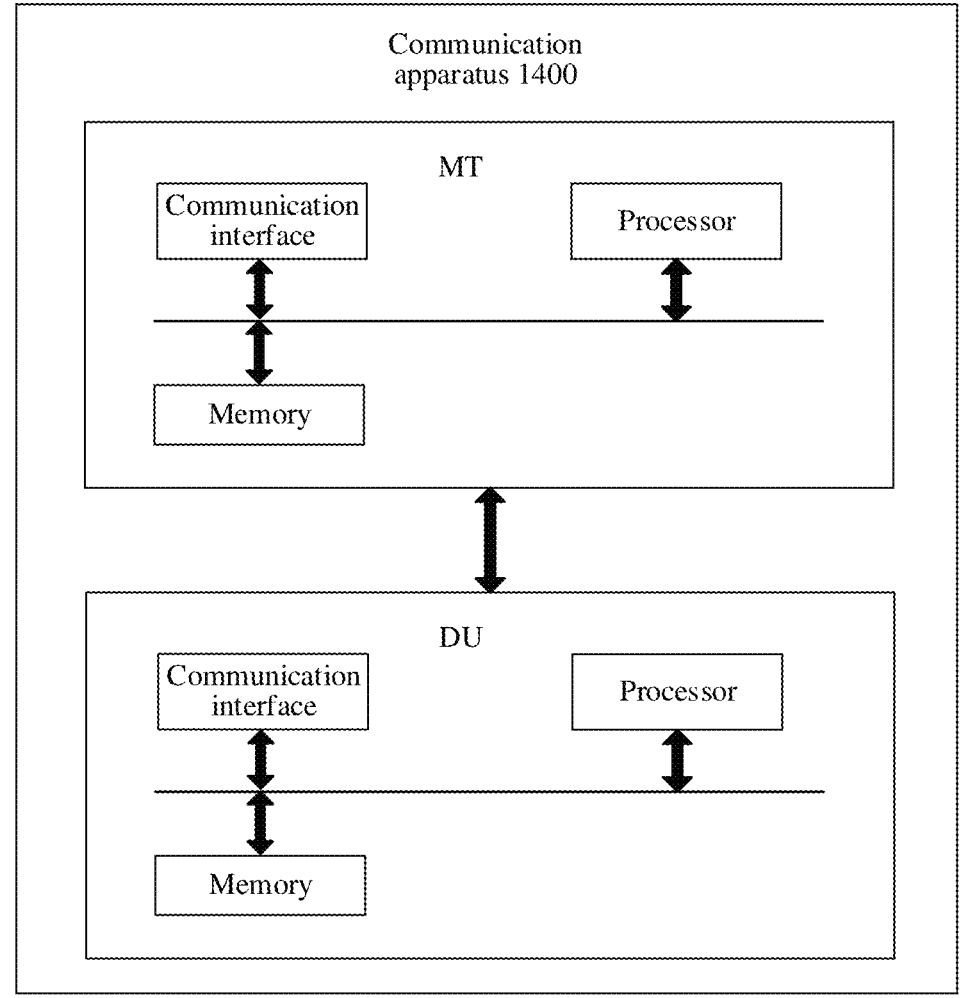
FIG. 14 is a schematic diagram of a third structure of a communication apparatus according to an embodiment of this application.

It should be understood that when the communication apparatus 1300 is the parent node or the relay node, for example, an IAB node, FIG. 14 shows another form of the communication apparatus 1300. In FIG. 14, a communication apparatus 1400 is an IAB node. It should be understood that the IAB node includes an MT and a DU. The MT may include a communication interface, a processor, a memory, and a bus connecting the communication interface, the processor, and the memory. The communication interface may be configured to communicate with a parent node of the IAB node, a source donor base station, or a target donor base station. The DU may also include a communication interface, a processor, a memory, and a bus connecting the communication interface, the processor, and the memory. The communication interface is configured to communicate with a child node of the IAB node or a terminal.

Figure 15:
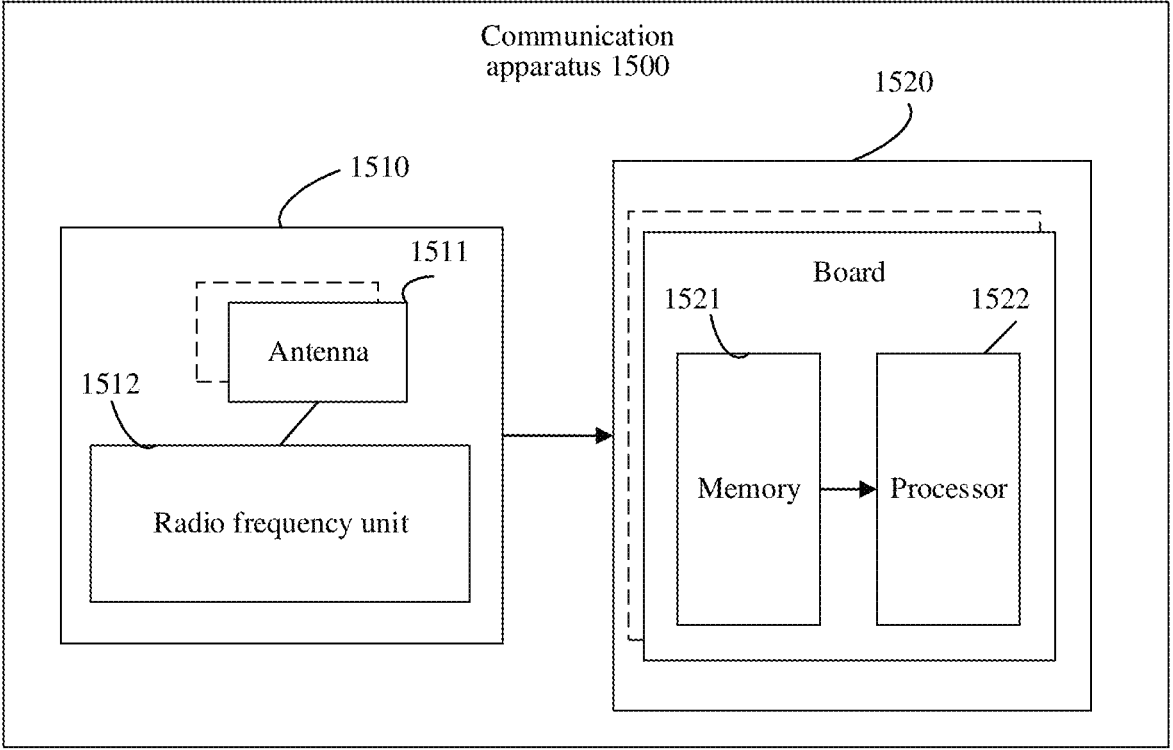
FIG. 15 is a schematic diagram of a fourth structure of a communication apparatus according to an embodiment of this application.

FIG. 15 is a simplified schematic diagram of a structure of a communication apparatus. For ease of understanding and illustration, in FIG. 15, the communication apparatus is a parent node or a relay node.

The communication apparatus 1500 may include a transceiver 1510, a memory 1521, and a processor 1522. The transceiver 1510 may be used by the communication apparatus to perform communication. The memory 1521 is coupled to the processor 1522, and may be configured to store a program and data that are necessary for implementing functions of the communication apparatus 1500. The processor 1522 is configured to support the communication apparatus 1500 in performing a corresponding function in the method, and the function may be implemented by invoking the program stored in the memory 1521.

Specifically, the transceiver 1510 may be a wireless transceiver, and may be configured to support the communication apparatus 1500 in receiving and sending signaling and/or data through a radio air interface. The transceiver

1510 may also be referred to as a transceiver unit or a communication unit. The transceiver 1510 may include one or more radio frequency units 1512 and one or more antennas 1511. The radio frequency unit, for example, a remote radio unit (RRU) or an active antenna unit (AAU), may be specifically configured to transmit a radio frequency signal and perform conversion between the radio frequency signal and a baseband signal. The one or more antennas may be specifically configured to radiate and receive the radio frequency signal. In some embodiments, the transceiver 1510 may include only the foregoing radio frequency unit. In this case, the communication apparatus 1500 may include the transceiver 1510, the memory 1521, the processor 1522, and the antenna 1511.

The memory 1521 and the processor 1522 may be integrated or may be independent of each other. As shown in FIG. 15, the memory 1521 and the processor 1522 may be integrated into a control unit 1520 of the communication apparatus 1500. For example, the control unit 1520 may include a baseband unit (BBU) of an LTE base station, and the baseband unit may also be referred to as a digital unit (DU). Alternatively, the control unit 1520 may include a distributed unit (DU) and/or a central unit (CU) in a base station of 5G or a future radio access technology. The control unit 1520 may include one or more antenna panels. A plurality of antenna panels may jointly support a radio access network (for example, an LTE network) of a single access standard, or may separately support radio access networks (for example, an LTE network, a 5G network, or another network) of different access standards. The memory 1521 and the processor 1522 may serve one or more antenna panels. In other words, the memory 1521 and the processor 1522 may be separately disposed on each antenna panel. Alternatively, the plurality of antenna panels may share a same memory 1521 and a same processor 1522. In addition, a necessary circuit may be disposed on each antenna panel. For example, the circuit may be configured to implement coupling between the memory 1521 and the processor 1522. The transceiver 1510, the processor 1522, and the memory 1521 may be connected by using a bus structure and/or another connection medium.

Based on the structure shown in FIG. 15, when the communication apparatus 1500 needs to send data, the processor 1522 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives a radio frequency signal through the antenna, converts the radio frequency signal into a baseband signal, and outputs the baseband signal to the processor 1522. The processor 1522 converts the baseband signal into data, and processes the data.

Based on the structure shown in FIG. 15, the transceiver 1510 may be configured to perform the foregoing steps performed by the transceiver module 1220, and/or the processor 1522 may be configured to invoke instructions in the memory 1521, to perform the steps performed by the processing module 1210.

An embodiment of this application further provides a communication system. Specifically, the communication system includes an IAB node, a donor node, and a plurality of parent nodes, or may further include more IAB nodes, donor nodes, and parent nodes.

The IAB node, the donor node, and the parent nodes are respectively configured to implement functions of related devices in FIG. 7. For details, refer to the related descriptions in the method embodiments. Details are not described herein again.

An embodiment of this application further provides a computer-readable storage medium, including instructions. When the instructions are run on a computer, the computer performs the method performed by the IAB node, the donor node, or the parent node in FIG. 7.

An embodiment of this application further provides a computer program product, including instructions. When the computer program product runs on a computer, the computer is enabled to perform the method performed by the IAB node, the donor node, or the parent node in FIG. 7.

An embodiment of this application further provides a chip system. The chip system includes a processor, and may further include a memory. The chip system is configured to implement functions of the IAB node, the donor node, or the parent node in the foregoing methods. The chip system may include a chip, or may include a chip and another discrete component.

It should be understood that the terms "system" and "network" may be used interchangeably in embodiments of this application. "At least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first configuration information and second configuration information are merely used to distinguish between different configuration information, but do not indicate different content, priorities, importance degrees, or the like of the two pieces of configuration information.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other forms.

The units described as separate components may or may not be physically separate, and components displayed as units may or may not be physical components, may be located at one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a technology of some approaches, or some of the technical solutions may be implemented in a form of a software product. A computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A resource configuration method, wherein the method comprises:
   obtaining, by a relay node, first information, wherein the first information comprises an identifier of at least one beam useable for sending a first signal;

sending second information to a parent node based on the first information, wherein the second information comprises a correspondence between the at least one beam and a desired power spectrum density (PSD); and receiving third information from the parent node, wherein the third information is useable to indicate to the relay node to determine a transmit power based on the third information.

2. The method according to claim 1, wherein the at least one beam is a beam useable by a mobile terminal (MT) in the relay node to communicate with the parent node.

3. The method according to claim 1, wherein the correspondence between the at least one beam and the desired PSD comprises:

the at least one beam and PSD information associated with the at least one beam, or PSD and beam information associated with the PSD.

4. The method according to claim 1, wherein the first signal comprises an uplink sounding reference signal (SRS).

5. The method according to claim 4, wherein each beam in the at least one beam corresponds to one or more desired PSD ranges, or each PSD range corresponds to one or more beams.

6. The method according to claim 1, wherein the first information further comprises an association relationship between a first case and the first signal, wherein the first signal corresponds to the at least one beam; and the first case is determined based on at least one parameter.

7. The method according to claim 1, wherein the second information further comprises an association relationship between a first case and the PSD, wherein the PSD corresponds to the at least one beam; and the first case is determined based on at least one parameter.

8. The method according to claim 6, wherein the parameter comprises at least one of:

a setting of a guard band between frequency bands during communication and transmission, a value of the guard band, a quantity of guard symbols, an undesired beam set, a quantity of (transceivers) TRxs of a carrier, a desired downlink transmit power of the mobile terminal (MT) in the relay node, a desired uplink transmit power PSD range of the MT, a maximum quantity of demodulation reference signal (DMRS) ports useable for downlink scheduling of the MT, or a maximum quantity of DMRS ports useable for uplink scheduling of the MT.

9. A communication apparatus, comprising:

at least one processor configured to execute non-transitory instructions thereby causing the communication apparatus to perform operations comprising:

obtaining first information, wherein the first information comprises an identifier of at least one beam useable for sending a first signal;

sending second information to a parent node based on the first information, wherein the second information comprises a correspondence between the at least one beam and a desired power spectrum density (PSD); and receiving third information from the parent node, wherein the third information is useable to indicate to a relay node to determine a transmit power based on the third information.

10. The communication apparatus according to claim 9, wherein the at least one beam is a beam useable by a mobile terminal (MT) in the relay node to communicate with the parent node.

11. The communication apparatus according to claim 9, wherein the correspondence between the at least one beam and the desired PSD comprises:

the at least one beam and PSD information associated with the at least one beam, or PSD and beam information associated with the PSD.

12. The communication apparatus according to claim 9, wherein the first signal comprises an uplink sounding reference signal (SRS).

13. The communication apparatus according to claim 9, wherein each beam in the at least one beam corresponds to one or more desired PSD ranges, or each PSD range corresponds to one or more beams.

14. The communication apparatus according to claim 9, wherein the first information further comprises an association relationship between a first case and the first signal, wherein the first signal corresponds to the at least one beam; and the first case is determined based on at least one parameter.

15. The communication apparatus according to claim 9, wherein the second information further comprises an association relationship between a first case and the PSD, wherein the PSD corresponds to the at least one beam; and the first case is determined based on at least one parameter.

16. The communication apparatus according to claim 14, wherein the parameter comprises at least one of:

a setting of a guard band between frequency bands during communication and transmission, a value of the guard band, a quantity of guard symbols, an undesired beam set, a quantity of (transceivers) TRxs of a carrier, a desired downlink transmit power of the mobile terminal (MT) in the relay node, a desired uplink transmit power PSD range of the MT, a maximum quantity of demodulation reference signal (DMRS) ports useable for downlink scheduling of the MT, or a maximum quantity of DMRS ports useable for uplink scheduling of the MT.

17. A non-transitory computer-readable storage medium configured to store non-transitory instructions, in response to the non-transitory instructions being executed by at least one processor, cause the at least one processor to perform operations comprising:

obtaining first information, wherein the first information comprises an identifier of at least one beam useable for sending a first signal;

sending second information to a parent node based on the first information, wherein the second information comprises a correspondence between the at least one beam and a desired power spectrum density (PSD); and receiving third information from the parent node, wherein the third information is useable to indicate to a relay node to determine a transmit power based on the third information.

18. The non-transitory computer-readable storage medium according to claim 17, wherein the at least one beam is a beam useable by a mobile terminal (MT) in the relay node to communicate with the parent node.

19. The non-transitory computer-readable storage medium according to claim 18, wherein the correspondence between the at least one beam and the desired PSD comprises:

the at least one beam and PSD information associated with the at least one beam, or PSD and beam information associated with the PSD.

20. The non-transitory computer-readable storage medium according to claim 17, wherein the first signal comprises an uplink sounding reference signal (SRS).

* * * * *